United States Patent
Ascolese et al.

(10) Patent No.: US 10,573,060 B1
(45) Date of Patent: Feb. 25, 2020

(54) CONTROLLER BINDING IN VIRTUAL DOMES

(71) Applicant: KILBURN LIVE, LLC, Los Angeles, CA (US)

(72) Inventors: Patrick John Ascolese, Seattle, WA (US); Jon McElroy, Los Angeles, CA (US)

(73) Assignee: KILBURN LIVE, LLC, Los Angeles, CA (US)

(*) Notice: Subject to any disclaimer, the term of this patent is extended or adjusted under 35 U.S.C. 154(b) by 0 days.

(21) Appl. No.: 16/009,142

(22) Filed: Jun. 14, 2018

(51) Int. Cl.
*A63F 13/525* (2014.01)
*A63F 13/5252* (2014.01)
*G06T 15/20* (2011.01)
*A63F 13/52* (2014.01)
*A63F 13/25* (2014.01)

(52) U.S. Cl.
CPC .............. *G06T 15/20* (2013.01); *A63F 13/25* (2014.09); *A63F 13/52* (2014.09); *A63F 2300/8082* (2013.01)

(58) Field of Classification Search
None
See application file for complete search history.

(56) References Cited

U.S. PATENT DOCUMENTS

| | | | | |
|---|---|---|---|---|
| 6,118,474 A * | 9/2000 | Nayar | ................ | G02B 13/06 |
| | | | | 348/36 |
| 6,204,854 B1 * | 3/2001 | Signes | ................ | G06T 9/00 |
| | | | | 345/427 |
| 6,697,062 B1 * | 2/2004 | Cabral | ................ | G06T 15/04 |
| | | | | 345/419 |
| 8,587,589 B2 * | 11/2013 | Collomb | ................ | G06T 15/50 |
| | | | | 345/419 |
| 9,721,393 B1 * | 8/2017 | Dunn | ................ | G06T 19/006 |
| 9,729,850 B2 * | 8/2017 | Cole | ................ | H04N 19/597 |
| 10,356,386 B2 * | 7/2019 | Lee | | |
| 2002/0190980 A1 * | 12/2002 | Gerritsen | ................ | G06T 19/00 |
| | | | | 345/419 |
| 2004/0061700 A1 * | 4/2004 | Shioya | ................ | G06T 15/50 |
| | | | | 345/426 |
| 2005/0162432 A1 * | 7/2005 | Ballin | ................ | G06T 13/20 |
| | | | | 345/473 |
| 2006/0132482 A1 * | 6/2006 | Oh | ................ | G06T 13/80 |
| | | | | 345/419 |
| 2006/0279570 A1 * | 12/2006 | Zhou | ................ | G06T 15/60 |
| | | | | 345/426 |
| 2010/0110069 A1 * | 5/2010 | Yuan | ................ | G06T 15/20 |
| | | | | 345/419 |

(Continued)

OTHER PUBLICATIONS

"Wii," Wikipedia, The Free Encyclopedia, retrieved Jun. 20, 2018 from <https://en.wikipedia.org/wiki/Wii>, 16 pages.

*Primary Examiner* — Martin Mushambo
(74) *Attorney, Agent, or Firm* — Sheppard, Mullin, Richter & Hampton LLP

(57) ABSTRACT

A partitioning of a display surface is determined to have changed. A reference vector is calculated according to the partitioning of the display surface. Position information in a real world coordinate system is modified based on the reference vector to produce modified position information. The modified position information is provided to a second system that provides an image to be displayed on the display surface.

20 Claims, 15 Drawing Sheets

(56) References Cited

U.S. PATENT DOCUMENTS

| | | | |
|---|---|---|---|
| 2013/0050260 A1* | 2/2013 | Reitan | G06F 3/011 |
| | | | 345/633 |
| 2013/0100132 A1* | 4/2013 | Katayama | H04N 13/275 |
| | | | 345/420 |
| 2015/0016686 A1* | 1/2015 | Kitamura | G06T 7/168 |
| | | | 382/103 |
| 2015/0112645 A1* | 4/2015 | Zeisl | G06F 17/50 |
| | | | 703/1 |
| 2015/0321103 A1* | 11/2015 | Barnett | G02B 27/2228 |
| | | | 345/419 |
| 2016/0071314 A1* | 3/2016 | Nordstoga | G06T 15/205 |
| | | | 345/427 |
| 2016/0150212 A1* | 5/2016 | Moura | H04N 19/597 |
| | | | 375/240.02 |
| 2017/0004648 A1* | 1/2017 | Li | G02B 27/017 |
| 2017/0078447 A1* | 3/2017 | Hancock | H04L 67/38 |
| 2017/0223368 A1* | 8/2017 | Abbas | H04N 19/146 |
| 2017/0251204 A1* | 8/2017 | Gupte | H04N 13/178 |
| 2017/0280126 A1* | 9/2017 | Van der Auwera | |
| | | | G06T 3/0062 |
| 2017/0323469 A1* | 11/2017 | Hakura | H04N 13/275 |
| 2017/0339391 A1* | 11/2017 | Zhou | H04L 65/604 |
| 2017/0339416 A1* | 11/2017 | Hendry | H04N 19/167 |
| 2017/0374375 A1* | 12/2017 | Makar | H04N 19/126 |
| 2018/0007387 A1* | 1/2018 | Izumi | G06T 9/00 |
| 2018/0007389 A1* | 1/2018 | Izumi | H04N 21/2343 |
| 2018/0027178 A1* | 1/2018 | Macmillan | H04N 5/23238 |
| | | | 348/38 |
| 2018/0315245 A1* | 11/2018 | Patel | G06T 15/04 |
| 2018/0374192 A1* | 12/2018 | Kunkel | G06T 15/205 |
| 2019/0104324 A1* | 4/2019 | Han | G06T 19/006 |
| 2019/0158815 A1* | 5/2019 | He | H04N 21/234327 |
| 2019/0182462 A1* | 6/2019 | Abbas | H04N 5/23238 |

* cited by examiner

CONTROLLER BINDING IN VIRTUAL DOMES

CROSS REFERENCE TO RELATED APPLICATION

This application incorporates by reference for all purposes the full disclosure of co-pending U.S. patent application Ser. No. 16/009,139, filed Jun. 14, 2018, and entitled "DYNAMIC SPLIT SCREEN."

BACKGROUND

Multiplayer virtual reality games are gaining in popularity. However, displaying individual views of a three-dimensional environment to multiple viewers presents a number of challenges if the multiple viewers are all viewing their individual views on a single display surface. The mathematics involved in segmenting the individual views for display on a dome-shaped display surface can be sufficiently complex as to make it impractical for a graphics processor to process in real time so as to not detract from the immersive reality experience of the viewers. Furthermore, dynamically adding or removing views to accommodate viewing participants that join or leave the game adds additional complexity that can further degrade system performance and the immersive reality experience.

BRIEF DESCRIPTION OF THE DRAWINGS

Various techniques will be described with reference to the drawings, in which.

DETAILED DESCRIPTION

Figure 1:
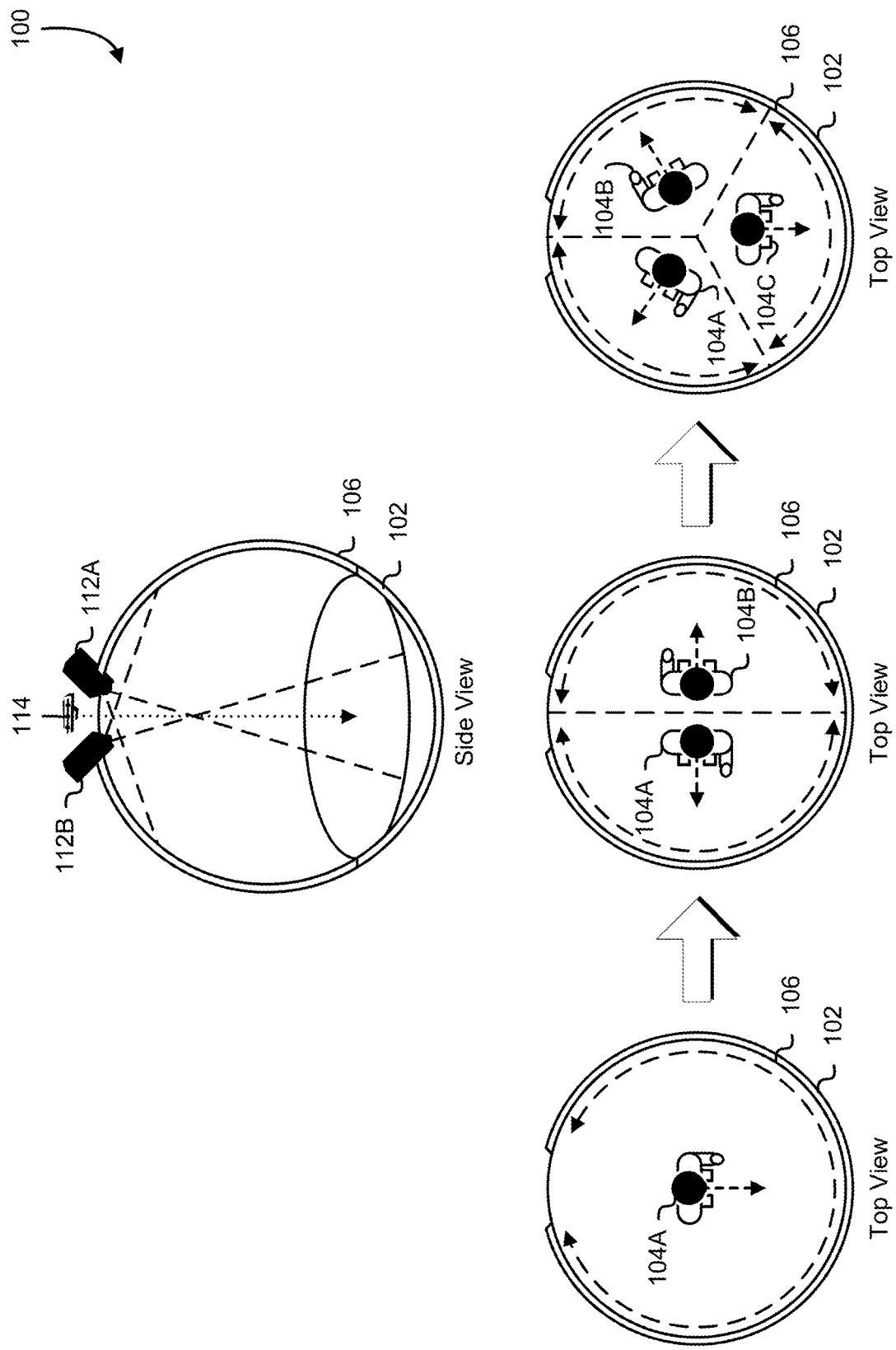
FIG. 1 illustrates an example of splitting screens dynamically in accordance with an embodiment.

Techniques and systems described below relate to dynamically partitioning a curved display surface for simultaneous display of multiple views of a three-dimensional environment. In one example, a correspondence between locations of pixels on faces of a cube map and locations of pixels on a two-dimensional map projection of a three-dimensional quadratic surface is determined. In the example, the two-dimensional map projection is determined to be split into a first split portion and a second portion. Also in the example, a first image of a virtual environment from a first viewpoint is obtained, with the first image corresponding to a face of a first cube map.

Further in the example, a second image of the virtual environment from a second viewpoint is obtained, with the second image corresponding to a face of a second cube map. Also in the example, based on the correspondence, pixels of the first image are mapped to pixels of the first split portion and pixels of the second image are mapped to pixels of the second split portion. Lastly in the example, the at least one image display device is caused, by providing the first split portion and the second split portion to at least one image display device to display the first split portion on a first portion of a display surface and display the second split portion on a second portion of the display surface.

In another example, a real world coordinate system for a physical space is set up, with the physical space including a display surface. In the example, a controller device located within a region of the physical space is detected. Also in the example, the controller device is determined to be associated with a set of virtual cameras centered at a viewpoint in a virtual environment, with the set of virtual cameras being associated with a relative virtual coordinate system having an origin with a vertical axis that intersects the viewpoint in the virtual environment and a front-facing axis that corresponds to a forward-facing direction of the set of virtual cameras. Likewise in the example, the display surface is detected as having been split into at least two views.

Further in the example, a reference vector is calculated based on the real world coordinate system and a center of a first view of the at least two views, with the reference vector corresponding to the front-facing axis. Also in the example, position and orientation information relative to the real world coordinate system is received from the controller device. Likewise in the example, the position and orientation information is translated based on the reference vector to produce translated position and orientation information. Lastly in the example, the first view is caused to be updated based on the translated position and orientation information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of computer-simulated virtual reality, by providing an efficient method for mapping, to a non-planar display surface, multiple views captured simultaneously from a single viewpoint. Additionally, techniques described and suggested in the present disclosure improve the efficiency of virtual reality computer systems by enabling the display surface to be split into multiple views, each having a separate reference vector for translating position and orientation information in the physical world to position and orientation information in a virtual world. Moreover, techniques described and suggested in the present disclosure are necessarily rooted in computer technology in order to overcome problems specifically arising with adding and removing individual views of a three-dimensional environment dynamically by creating a two-dimensional map projection of a three-dimensional view that can be efficiently split into individual views.

FIG. 1 illustrates aspects of an environment 100 in which an embodiment may be practiced. As illustrated in FIG. 1, the environment 100 may include one or more individuals 104A-04C within a region of a physical space 102 that includes a display surface 106. In one example, the physical space 102 is a dome having one or more image projectors 112 and a sensor 114 for detecting objects and/or motion within the region of the physical space 102.

In an embodiment, the physical space 102 is an enclosure having a region that can be occupied by at least two individuals, such as the one or more individuals 104A-04C, that includes a display surface, such as the display surface 106, viewable by at least two individuals. In some embodiments the physical space is a dome-based video projection environment, such as a fulldome. However, it is contemplated that techniques of the present disclosure may be applied to various physical spaces with display surfaces, such as a room with a curved projection screen, a hexahedron-shaped room with two or more flat display surfaces, and so on.

In an embodiment, the display surface 106 is a projection surface upon which images are projected (e.g., as a video or as images depicting a virtual reality environment) for view by the one or more individuals 104A-04C. It is contemplated that the display surface 106 may be permanently installed, may be portable (e.g., free-standing, floor-rising, ceiling rising, etc.), may be a wall, may be fabric, may be inflatable, or may be opaque or translucent. The display surface 106 may be any of a variety of colors, such as white, gray, or beige, depending on implementation. Likewise, the reflectivity and texture of the display surface 106 may vary by implementation depending on factors such as ambient light level and luminous power of one or more projectors that project images onto the display surface. It is contemplated that the techniques described in the present disclosure may be applied to various display surface shapes, such as flat (i.e., non-curved), curved, or dome-shaped. In various embodiments, the display surface 106 is viewable by the individuals 104A-04C in 360 degrees (e.g., the display surface 106 has a 360-degree viewing area). It is further contemplated that, in some embodiments, the display surface 106 is a front projection surface, whereas in other embodiments the display surface 106 is a back projection surface.

In an embodiment, the one or more image projectors 112A-12B may be optical devices that project images onto a surface such as the display surface 106. In some embodiments, the image projectors 112A-12B project images by shining a light through a lens. In other embodiments, the one or more image projectors 112A-12B project the image using one or more lasers. In some implementations, the one or more image projectors 112A-12B project onto the display surface 106 from the front. In other implementations, the image projectors 112A-12B additionally or alternatively projects onto the display surface 106 from behind (not depicted). It is contemplated that the image projectors 112A-12B may utilize any of a variety of projection technologies, including cathode ray tube (CRT) projection, Digital Light Processing (DLP) projection, liquid crystal display (LCD) projection, liquid crystal on silicon (LCOS), or laser video projection.

In an embodiment, the sensor 114 comprises one or more sensors usable, from collected sensor data, to perform range imaging to determine a distance (e.g., depth) and/or shape of an object, such as the one or more individuals 104A-04C, from data obtained from the sensor 114. That is, in some embodiments, the sensor is a depth sensor that uses one or more of a variety of techniques, such as stereo triangulation, sheet of light triangulation, structured light, time-of-flight (TOF), interferometry, blob detection, or coded aperture, to determine a distance and/or shape of an object. In some embodiments, the sensor 114 utilizes stereo triangulation to determine the depth of an object based on data acquired using multiple image capture devices in the sensor 114. In other embodiments, the sensor 114 uses time-of-flight (ToF) to determine depth and/or shape of an object from the sensor 114. In an embodiment, the sensor 114 utilizes a structured three-dimensional scanner that measures three-dimensional shapes of objects using projected light patterns and a camera system. In embodiments, the sensor 114 uses radio waves (e.g., radar) to determine range, angle, and/or velocity of an object. In embodiments, the sensor 114 uses light detection and ranging (Lidar) to determine depth. In other embodiments, the sensor 114 is one or more image capture devices that capture images of the environment 100 from which distance to the one or more individuals 104A-04C can be determined, such as using depth of field data (e.g., amount of blurring indicating a distance from the plane of focus) or parallax (e.g., displacement of objects between two stereo images).

Although the projection surface depicted in FIG. 1 is dome-shaped, it is contemplated that the techniques of the present disclosure may be applied to any shape of projection surface, such as, for example, a flat projection screen or a curved projection screen. It is contemplated that curved projection screens include semi-circular, cylindrical, and dome-shaped projection screens. It is further contemplated that the display surface may be a display device. In some examples, a "display device" (also referred to as a "monitor" or "screen") refers to a device capable of visually representing (e.g., via cathode-ray tube, liquid crystal display, light emitting diode, projection surface, etc.) information (e.g., words, numbers, drawings, images, video, etc.) received from an output device (e.g., computer, cable box, video camera, etc.).

In an embodiment, the one or more individuals 104A-04C are human individuals viewing the display surface 106 of the physical space 102. As one example, the one or more individuals 104 may be players in a cooperative or competitive, immersive game being displayed on the display surface 106. It is contemplated, however, that in some implementations, the one or more individuals may any of various animate entities, including one or more of an animal, a human, a machine capable of movement (e.g., a robot, a vehicle, etc.), or some other such other animate entity. In the environment 100, it is seen that at a first time, the physical space 102 is occupied by only a first individual 104A. As a result, the entirety of the display surface 106 is rendered for viewing by the first individual 104A. For example, the first individual 104A in a fulldome may have a 360-degree view of a virtual environment (e.g., a virtual reality game or video) from a single viewpoint rendered onto the display surface 106. In some examples, "render" refers to making perceptible to a human (e.g., for example as data, commands, text, graphics, audio, video, animation, and/or hyperlinks, etc.) such as via a display, monitor, printer, electric paper, ocular implant, cochlear implant, speaker, and so on.

At a second time, the first individual 104A is joined by a second individual 104B. The system, as described in the present disclosure may detect the presence of the second individual 104B, such as via a motion capture device, depth sensing device, or a sensor worn or carried by the second individual 104B, within the physical space 102. For example, the second individual 104B may hold a game controller that has an active or passive device, sensor, or tag that allows the system to detect and track the controller's location within the physical space 102. As a result of the second individual 104B entering the physical space 102, the system may determine that the second individual 104B should be shown a different view from the first individual 104A. For example, the first individual 104A and the second individual 104B may be players playing a game that takes place in a virtual world and the players may have different positions and/or orientations from each other in the virtual world. As a consequence of determining to display, simultaneously, different views for each of the first individual 104A and the second individual 104B, the system determines to partition the display surface 106 (also referred to as "splitting" the screen) into two portions—one for each of the first individual 104A and the second individual 104B—such that one image is depicted on a first portion and another image is depicted on the other portion. In this manner, each individual has a dedicated portion of the display surface 106 upon which his/her respective viewpoint may be rendered. As can be seen, each of the first individual 104A and the second individual 104B has been dedicated a 180-degree view of the display surface 106.

In some embodiments, the system determines to partition/divide the display surface 106 according to a preset scheme depending upon the number of individuals detected/tracked within the physical space 102 who need separate viewpoints. For example, whenever there are two individuals within the physical space 102, the screen may be split the same way (e.g., bisecting from front-to-back) regardless of the locations of the individuals within the physical space 102. In other embodiments, the system may determine where and how to split the display surface 106 depending on the locations and/or orientations (e.g., facing directions) of the individuals and/or sensor device/tags associated with the individuals. For example, if the first individual 104A and the second individual 104B are facing the same direction, the system may determine to split the display surface 106 in a manner such that each individual has at least a partial view of their respective virtual viewpoint. In other words, the system may determine to split the screen such that a virtual viewpoint is not rendered completely outside the visibility (e.g., behind) the individual with which it is associated.

At a third time, it can be seen that a third individual 104C has entered the physical space 102. As a result of the third individual 104C entering the physical space 102, the system of the present disclosure may determine that the third individual 104C should be shown a different view from the first individual 104A and the second individual 104B. As a consequence of determining to simultaneously display different views for each of the one or more individuals 104A-04C, the system determines to divide/partition the display surface 106 (also referred to as "splitting" the screen) into thirds—one for each of the first individual 104A, the second individual 104B, and the third individual 104C—such that one image is depicted on a first portion of the display surface 106 allocated to the first individual 104A, another image is depicted on a second portion of the display surface 106 allocated to the second individual 104B, and yet another image is depicted on a third portion of the display surface 106 allocated to the third individual 104C. In this manner, each individual has a dedicated portion of the display surface 106 upon which his/her respective viewpoint may be rendered. As can be seen, each of the first individual 104A and the second individual 104B has been dedicated a 120-degree view of the display surface 106. It is further contemplated that splitting the screen may be reversed, such that portions of the display surface 106 previously allocated to an individual may be deallocated and reallocated to the remaining individuals.

Although the portions of the display surface 106 dedicated to each of the one or more individuals 104A-04B are depicted in FIG. 1 as being relatively the same size, it is contemplated that in some embodiments the amount of the display surface 106 allocated to a particular individual may be based on other factors. For example, the one or more individuals 104A-04B may be playing a cooperative or competitive game in which, if the players' characters are wounded, the amount of the display surface 106 allocated to the wounded player is reduced by an amount corresponding to the extent and/or type of injury.

Figure 2:
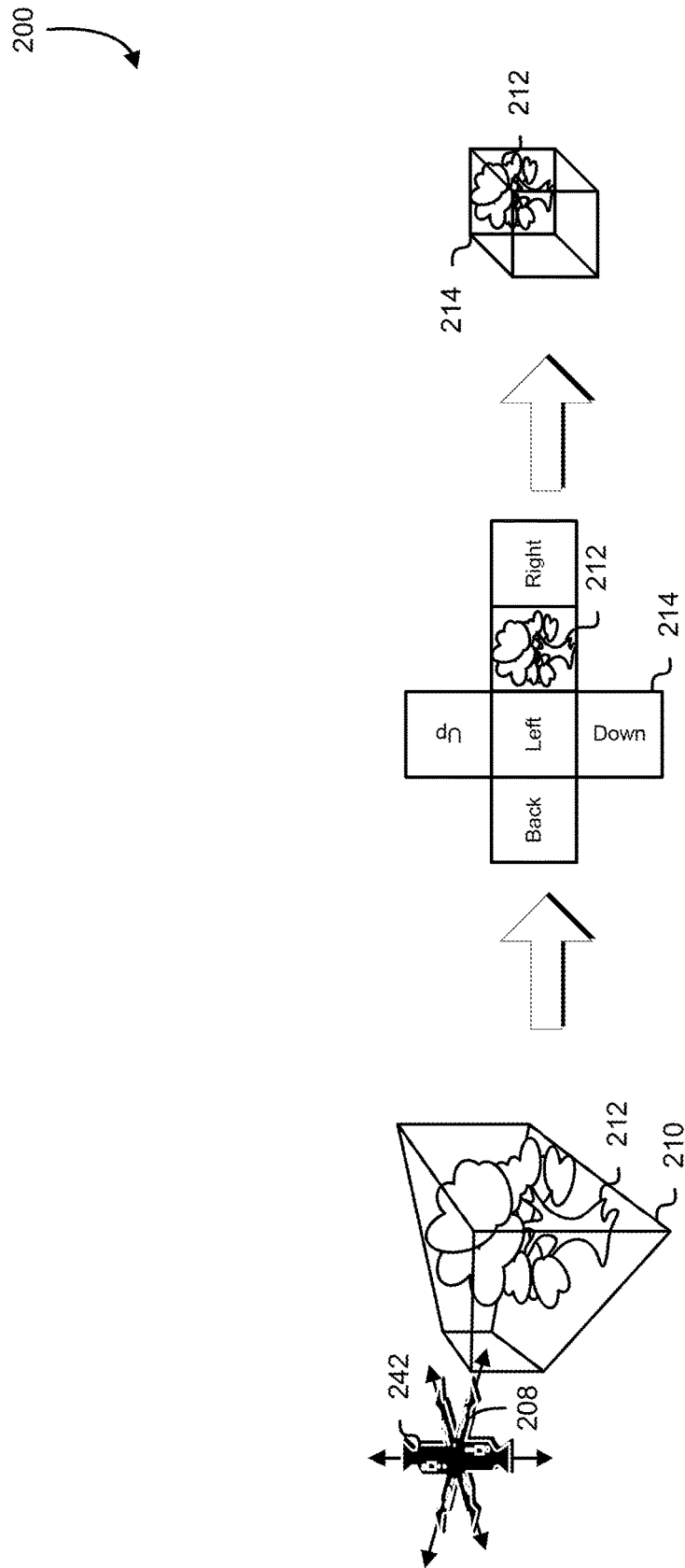
FIG. 2 illustrates an example of mapping an image to a cube map in accordance with an embodiment.
Figure 3:
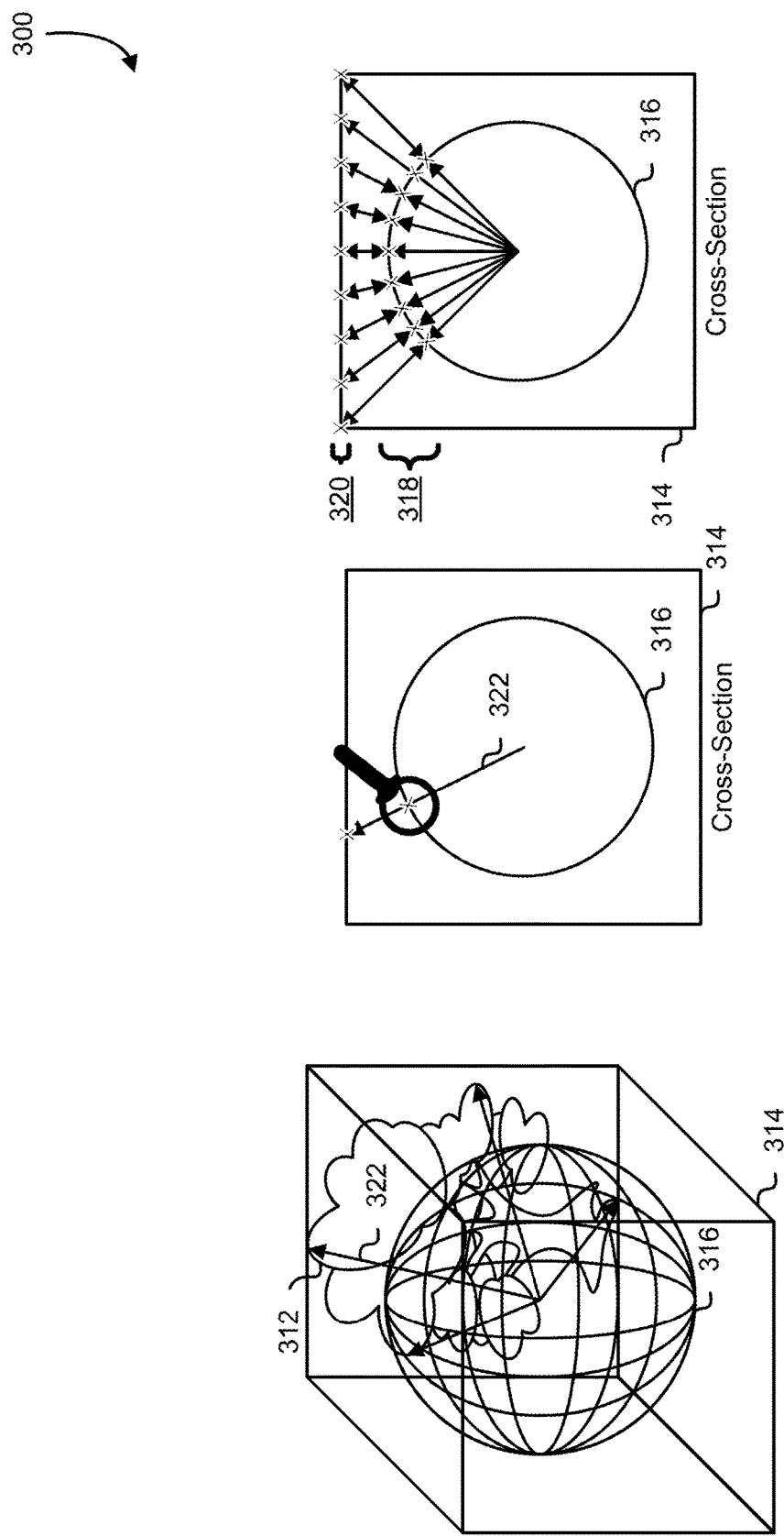
FIG. 3 illustrates an example of mapping the cube map onto a sphere in accordance with an embodiment.
Figure 4:
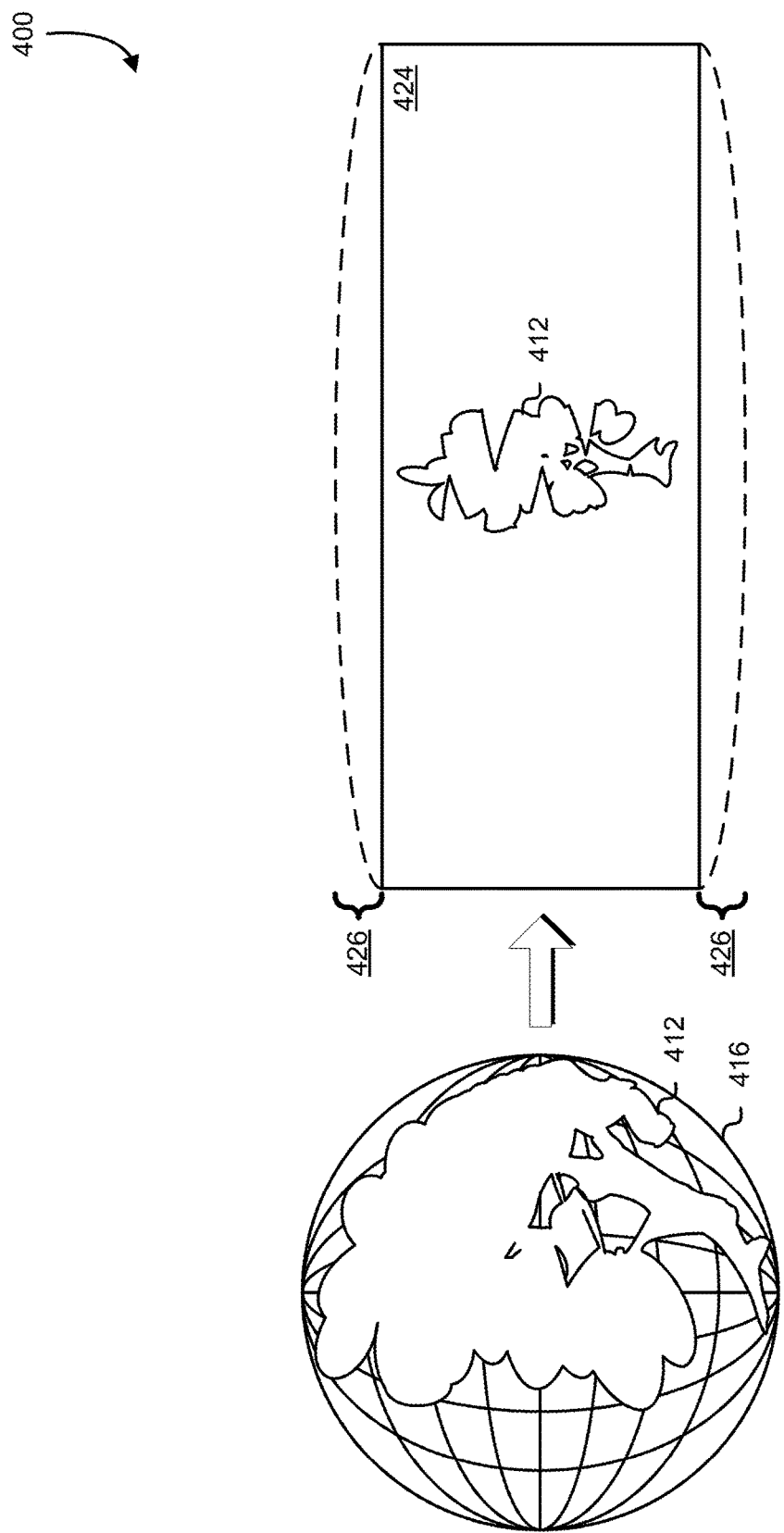
FIG. 4 illustrates an example of a two-dimensional map projection of the sphere in accordance with an embodiment.

FIGS. 2-4 illustrate the stages for generating a two-dimensional map of a 360-degree view that can be efficiently and dynamically split in accordance with the present disclosure. FIG. 2 illustrates an example 200 of an embodiment of the present disclosure. Specifically, FIG. 2 depicts a viewing frustum 210 of a virtual camera 208 that captures an image of a virtual object 212, maps the image of the virtual object 212 to a face of a cube map 214, which is "folded" into a cube.

In an embodiment, the virtual camera 208 is a member of a set of virtual cameras comprising a virtual camera rig 242 that captures a view of a three-dimensional virtual world. However, it is also contemplated that the techniques described in the present disclosure may be used with a camera rig comprising real, physical cameras in the real world. The virtual camera rig 242 may be a set of virtual cameras having an orientation and a position in a virtual environment. The virtual camera rig 242 may be associated with an identifier (e.g., "rig1") that distinguishes the virtual camera rig 242 from other virtual camera rigs that may be located in the virtual environment. For example, the virtual camera 208 may be one of six virtual cameras comprising the virtual camera rig 242 associated with a viewpoint in a virtual world to display to an individual, such as one of the one or more individuals 104A-04C of FIG. 1. Such six cameras may be oriented 90 degrees from each other such as facing positive X (left), negative X (right), positive Y (up), negative Y (down), positive Z (front), negative Z (back) directions.

In an embodiment, the viewing frustum 210 is a volume that contains the objects visible to the virtual camera 208. In the example 200, the viewing frustum 210 contains the virtual object 212, which is subsequently captured in an image by the virtual camera 208. Each virtual camera of the set of virtual cameras of which the virtual camera 208 is a member may have a different viewing frustum.

In an embodiment, the virtual object 212 is a digital representation of an object that is located in a virtual environment. In the example 200, the virtual object is a tree, which is captured as a two-dimensional image by the virtual camera 208. However, is contemplated that the virtual object 212 could be a representation of any animate or inanimate virtual object in a virtual environment.

In an embodiment, the cube map 214 comprises six faces upon which a virtual environment is projected. The cube map 214 comprises six images, each from a different viewpoint defined by a 90-degree viewing frustum, such as the viewing frustum 210. In the example 200, the virtual object 212, being located in front of the virtual camera 208 facing the front direction, is rendered onto the front face of the cube map 214.

FIG. 3 illustrates an example 300 of an embodiment of the present disclosure. Specifically, FIG. 3 depicts a mathematical sphere 316 upon which the images depicted on each of the faces of the cube map 314, such as the front face image containing a virtual object 312, are to be mapped. FIG. 3 depicts a ray 322 passing through sample points 318 on the mathematical sphere 316, and pixels 320 on a face of the cube map 314 struck by the ray 322.

In an embodiment, the virtual object 312 is a digital representation of an object captured from a viewpoint by a virtual camera, such as the virtual camera 208 of FIG. 2.

In an embodiment, the cube map 314 is another depiction of the cube map 214 of FIG. 2. The example 300 also depicts two-dimensional cross-sections of the mathematical sphere 316 and the cube map 314 for ease of illustration.

In an embodiment, the mathematical sphere 316 is a mathematic three-dimensional quadratic surface of such dimensions that it may be contained within the cube map 314; that is, if the cube map if folded into a cube with the edges of the faces of the cube map being edges of the cube, the mathematical three-dimensional quadratic surface could be located within the cube map 314. Although the present disclosure uses the example of a sphere within the cube map 314 as a sphere, it is contemplated that any of a variety of other three-dimensional quadratic surfaces may be used. For example, in place of the mathematical sphere 316, may be an entire or partial ellipsoid, elliptic paraboloid, elliptic cylinder, circular paraboloid, or spheroid.

In an embodiment, a pixel on a face of the cube map 314 may be mapped to the mathematical sphere 316 by following a line, such as the ray 322, cast from the center of the mathematical sphere 316 to a pixel on the face of the cube map. The point of intersection of the ray 322 and the surface of the mathematical sphere 316 may be the location on the mathematical sphere that corresponds to the pixel on the face of the cube map 314. For example, if the ray 322 ends at a red pixel on the face of the cube map 314, the point of intersection of the surface of the mathematical sphere may be designated as being a red pixel.

In an embodiment, the sample points 318 are points on the surface of the mathematical sphere 316. The density of the sample points 318 may be dependent upon a preferred resolution at which the image should be mapped to the mathematical sphere 316. That is, the more numerous and close together the sample points 318 are, the greater the resolution. The sample points 318 may correspond to whichever of the pixels 320 is intersected by the ray 322. Thus, for each of the sample points 318 on the sphere (depending on the preferred resolution), the system of the present disclosure determines where a line (the ray 322) passing from the center of the sphere through the point intersects with the face of the cube map 314 and associates the pixel located at that intersection point with the sample point. In some embodiments, the color of the pixel at the intersection is assigned to be the color of the sample point. Note that in some implementations, the actual pixel color may not be sampled for each image frame but, rather, the system of the present disclosure determines the correspondence of which pixel on the cube map 314 is associated with which sample point. In this manner, the mapping between the sample points 318 and the pixels 320 need only be performed once and as colors of the pixels 320 vary from image frame to image frame, the system automatically determines the color of the sample point 318 based on the predetermined correspondence without having to re-calculate the intersection points.

In an embodiment, the pixels 320 are two-dimensional picture elements that make up the images that are mapped to the cube map 314. Thus, representations of the virtual environment and the virtual objects within the virtual environment may be represented by sets of the pixels. Each of the pixels 320 may have one or more values that represent a hue, brightness, and/or luminosity that comprises the color of the pixel. The particular pixels represented with an "X" in FIG. 3 are pixels at the intersection point of the rays as they pass through the sample points 318 and intersect the faces of the cube map 314. Note, however, that it is contemplated that in some implementations, the ray 322 may be reversed such that the ray 322 starts at a pixel and is directed to the center of the mathematical sphere 316, and the point that the ray 322 intersects with the surface of the mathematical sphere 316 may be determined to be the corresponding sample point.

FIG. 4 illustrates an example 400 of an embodiment of the present disclosure. Specifically, FIG. 4 depicts a mathematical sphere 416 upon which the image from a face of a cube map, such as the cube map 314 of FIG. 3, has been mapped. As can be seen, a digital object 412, similar to the virtual object 212, is represented on the mathematical sphere. FIG. 4 further depicts a transformation (e.g., unwrapping) of the mathematical sphere 416 into a two-dimensional projection image 424. In an embodiment, the digital object 412 is a representation of an object in a virtual environment, such as the virtual object 212 of FIG. 2. As can be seen in FIG. 4, after the mathematical sphere 416 is transformed ("unwrapped") in accordance with a map projection algorithm to form the two-dimensional projection image 424, the digital object 412 may appear to be distorted. However, in embodiments, the system of the present disclosure processes the two-dimensional projection image 424 for display such that, depending on the shape of the display surface, the distortion in the two-dimensional projection image 424 is compensated for and the digital object 412 appears to individuals (e.g., the one or more individuals 104A-04B of FIG. 1) to be displayed with little or no distortion.

In an embodiment, the mathematical sphere 416 is a mathematical model of a sphere, such as the mathematical sphere 316 of FIG. 3, around which images from a cube map (e.g., the cube map 314) are wrapped (e.g., projected). As described in the present disclosure, the mathematical sphere 416 need not be a sphere, but may alternatively be a different three-dimensional quadratic surface model, such as an entire or partial ellipsoid, elliptic paraboloid, elliptic cylinder, circular paraboloid, or spheroid.

In an embodiment, the two-dimensional projection image 424 is a map projection comprising pixels that represent the image that was wrapped around the surface of the sphere. It is contemplated that various types of map projections may be used to for generating the two-dimensional projection image 424, including, for example, equilateral, Cassini, Mercator, Gauss-Kruger, Gall stereographic, Miller, Lambert cylindrical equal-area, Behrmann, Hobo-Dyer, Gall-Peters, Central cylindrical, Sinusoidal, Mollweide, Eckert, Ortellius oval, Goode homolosine, Kavrayskiy, Robinson, natural earth, Tobler hyperelliptical, Wagner, Collignon, HEALPix, Boggs eumorphic, Craster parabolic, McBryde Thomas flat-pole quartic, quartic authalic, the Times, Loximuthal, Aitoff, Hammer, Winkel tripel, Van der Grinten, Equidistant conic, Lambert conformal conic, Albers conic, werner, Bonne, Bottomley, American polyconic, Rectangular polyconic, Latitudinally equal-differential polyconic, azimuthal equidistant, gnomonic, Lambert azimuthal equal-area, stereographic, orthographic, vertical perspective, two-point equidistant, Peirce quincuncial, Guyou hemisphere-in-a-square, Adams hemisphere-in-a-square, Lee conformal world on a tetrahedron, authagraph, octant, Cahill-Keyes, Waterman, quadrilateralized spherical cube, Fuller, myriahedral, Craig retroazimuthal, Hammer retroazimuthal front and back hemisphere, Littrow, armadillo, GS50, Nicolosi globular, Roussilhe oblique stereographic, and Hotine oblique mercator projections.

In an embodiment, the unused portions 426 are either, depending on the map projection used, areas of the mathematical sphere 416 that, after transforming the mathematical sphere 416, are discarded (and thus, not displayed) or are areas of the two-dimensional projection image 424 that do not contain portions of the mathematical sphere 416 (e.g., they are artifacts of the particular map projection). Depending on the map projection used, the unused portions 426 may or may not be present in all embodiments.

Figure 5:
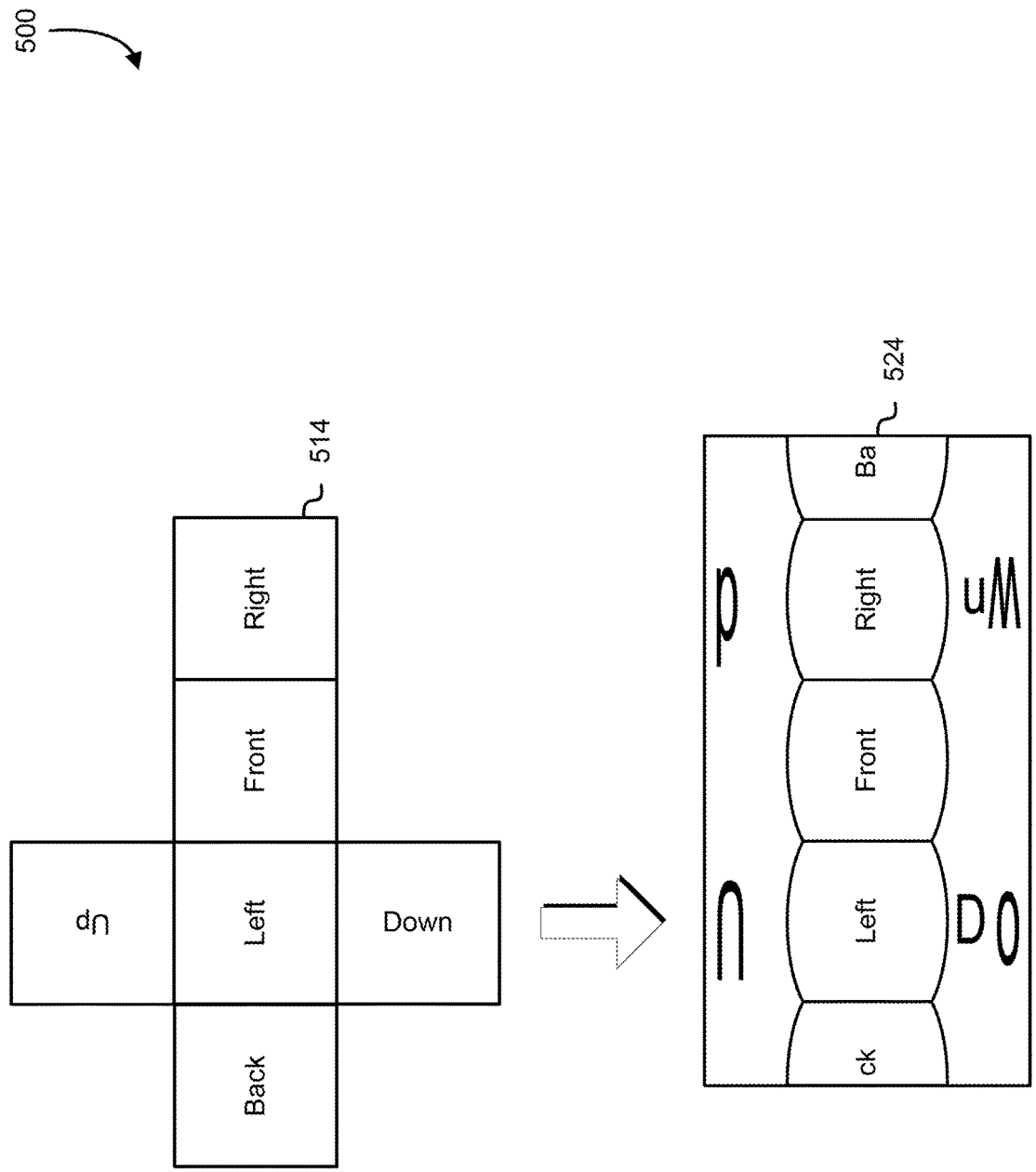
FIG. 5 illustrates an example of transforming a cube map to a projection image in accordance with an embodiment.

FIG. 5 illustrates an aspect 500 of an embodiment of the present disclosure. Specifically, FIG. 5 depicts how pixels from a cube map 514 (e.g., the cube maps 314 and 414 of FIGS. 3 and 4 respectively) are mapped to a projection image 524 after undergoing the stages depicted in FIGS. 2-4. Depending on differences of resolution between the cube map 514 and the resolution of the projection image 524 and depending on amounts and type of distortion produced by spherical mapping described in FIG. 3, the density of the sample points 318, and the map projection used to produce the projection image, there may not necessarily be a one-to-one correspondence between pixels in the cube map 514 and pixels in the projection image 524. For example, some pixels in the cube map 514 may not have corresponding pixels in the projection image 524 and/or some pixels in the cube map 514 may have multiple corresponding pixels in the projection image 524.

As shown in FIG. 5, pixels from the front face of the cube map 514 may be mapped to the center portion of the projection image 524 and pixels from the left and right faces may be mapped to left and right portions of the projection image 524 respectively. Pixels from the back face of the cube map 514 may be split between the left and right sides of the projection image 524, and pixels from the up and down faces may be split into multiple portions on the top and bottom portions of the projection image 524. Note that, for example, for an equirectangular projection, such as that shown in FIG. 4, the up and down portions in the projection image 524 may be stretched/distorted such that they form contiguous upper and lower portions respectfully. Likewise, for an equirectangular projection, the left, right, front, and back portions may be modified to be square or rectangular such that the portions adjoin, which may cause the images from the cube map 514 to appear more distorted at the upper and lower regions of the projection image 524.

In embodiments, various effects (not shown in FIG. 5) such as graphics overlays, wipe transitions (e.g., barn door wipe, iris slow wipe, star wipe, heart wipe, matrix wipe, clock wipe, horizontal wipes, vertical wipes, diagonal wipes, etc.) may be implemented on the projection image 524. For example, a wipe transition from one scene to another scene (e.g., the first individual 104A of FIG. 1 is "teleported" from one location in a virtual environment to another location in the virtual environment) by splitting the projection image 524 into two portions in accordance with the type of wipe transition and displaying the scene being transitioned from in a first portion and the scene being transitioned to in a second, smaller portion, and for successive frames of the projection image 524, frame-by-frame expanding the second portion while reducing the first portion in accordance with the wipe transition until the scene being transitioned to is fully displayed on in the projection image 524 and the scene being transitioned from is no longer displayed. Thus, the projection image 524 and successive projection images are members of a sequence of projection images that, displayed in sequence, perform the wipe transition. Thus, in this manner, two-dimensional wipe transitions may be applied to images captured in three-dimensions.

Note that the aspect 500 depicted in FIG. 5 shows a particular map projection for illustration purposes only, but it is contemplated, as described in relation to FIG. 4, that different map projections may be used, and placement of pixels corresponding to front, left, right, back, up, and down faces of the cube map 514 may be in different locations than that depicted in FIG. 5, depending on the map projection used.

Figure 6:
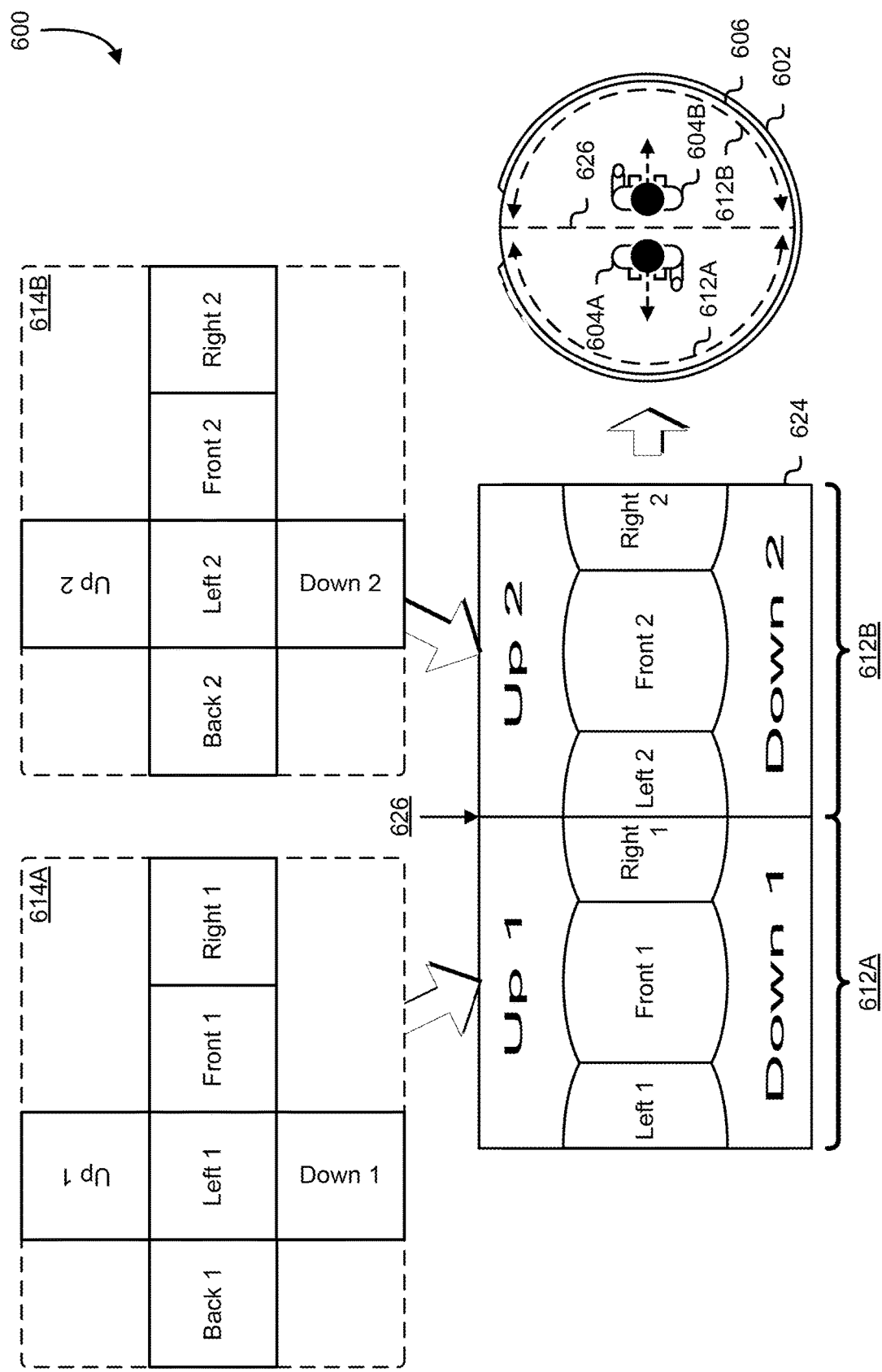
FIG. 6 illustrates an example of transforming dual cube maps to a projection image for display as a split screen in accordance with an embodiment.

FIG. 6 illustrates an example 600 of an embodiment of the present disclosure. Specifically, FIG. 6 illustrates how, using the stages described in FIGS. 2-5, images from cube maps 614A-14B can be efficiently and dynamically split so as to provide one or more individuals 604A-04B with individual viewpoints 612A-12B on a curved display surface. In an embodiment, the physical space 602 is a physical enclosure, similar to the physical space 102 of FIG. 1, within which the one or more individuals 604A-04B can view their individual viewpoints 612A-12B on the display surface 606. In an embodiment, the one or more individuals 604A-04B are similar to the one or more individuals 104A-04C of FIG. 1.

In an embodiment, the display surface 606 is similar to the display surface 106 of FIG. 1. In embodiments, the display surface 606 is a curved display surface, such as a dome projection screen. In an embodiment, the projection image 624 is an image that, as a result of being provided to hardware and/or software of one or more image projectors, such as the image projectors 112A-12B of FIG. 1, is displayed on the display surface 606. The projection image 624 may be configured to display separate images to the one or more individuals 604A-04B by determining a separation point, also referred to as a split 626 for the images. By separating the individual viewpoints 612A-12B at the split 626 in the projection image 624, the result is that the projection image 624 appears to be split into different viewpoints on the display surface 606.

In an embodiment, the individual viewpoints 612A-12B are images captured from different viewpoints (e.g., by different cameras and/or camera rigs) for simultaneous, separate display to the individuals 604A-04B. The individual viewpoints 612A-12B may have been captured by virtual cameras, similar to the virtual camera 208 of FIG. 2, as images of a virtual environment. In an embodiment, the cube maps 614A-14B are each similar to the cube maps 214, 314, and 514 of FIGS. 2, 3, and 5 respectively. For example, the individual viewpoints 612A-12B may be rendered onto separate portions of the projection image 624. In FIG. 6, the individual viewpoint 612A is illustrated to be partially rendered onto the left half of the projection image 624 such that the pixels corresponding to the front face of the cube map 614A are located in the center of the left half of the projection image 624. Likewise in FIG. 6, the individual viewpoint 612B is illustrated to be partially rendered onto the right half of the projection image 624 such that the pixels corresponding to the front face of the cube map 614B are located in the center of the right half of the projection image 624. Note that pixels corresponding to the back faces and portions of the left, right, up, and down faces of the cube maps 514 do are not rendered to the projection image 624 because those images may be partially or wholly displaced by the opposing image. In this manner, the individual viewpoints 612A-12B are separately and exclusively displayed on the display surface 606.

Figure 7:
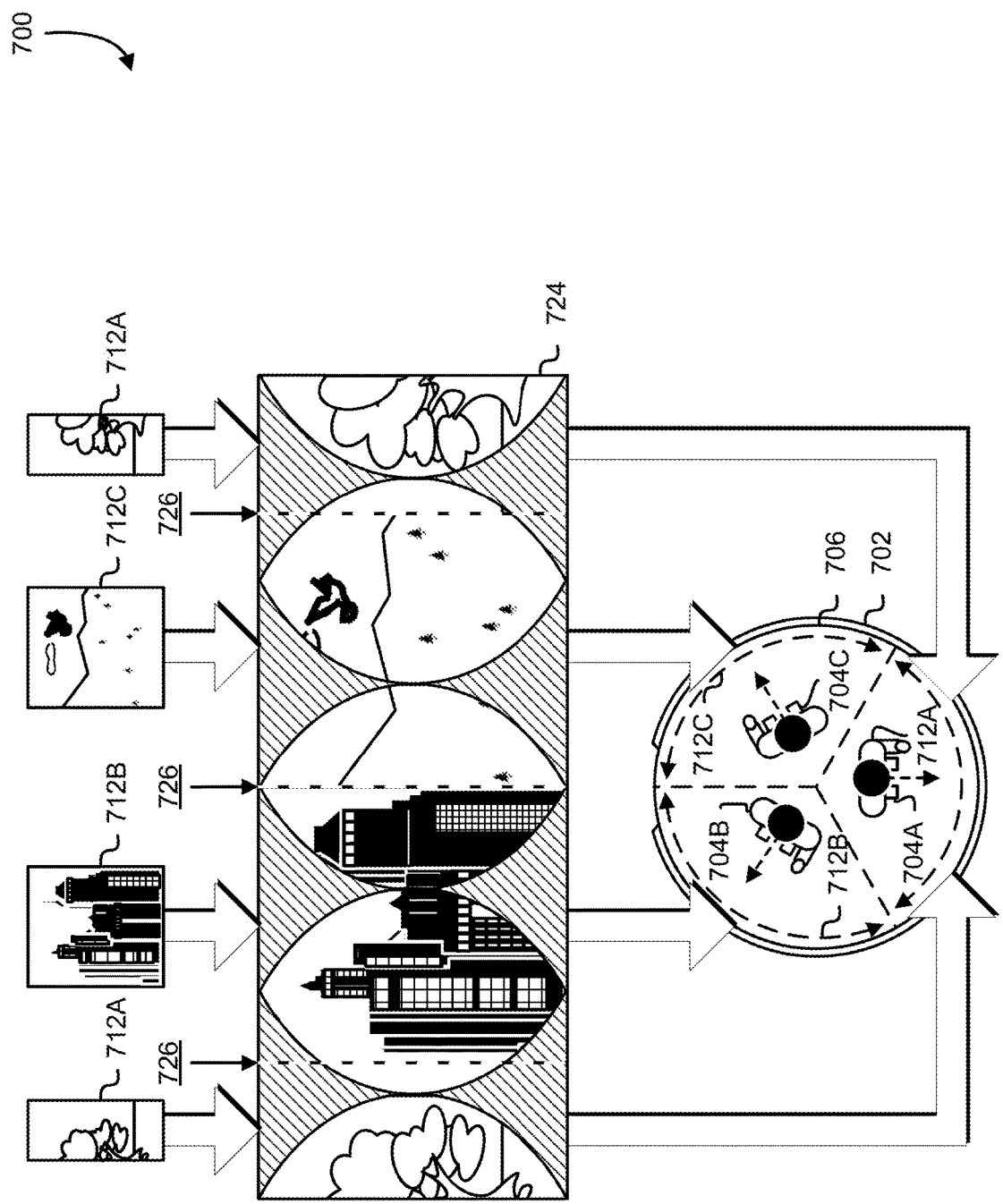
FIG. 7 illustrates an example of multiple viewpoints on a projection image for display as a split screen in accordance with an embodiment in accordance with an embodiment.

FIG. 7 illustrates an example 700 of an embodiment of the present disclosure. Specifically, FIG. 7 depicts splitting portions of a plurality of viewpoints 712A-12B for view by a plurality of individuals 704A-04C viewing a display surface 706 of a physical space 702.

In an embodiment, the physical space 702 is similar to the physical spaces 102 and 602 of FIGS. 1 and 6 respectively. Likewise, in an embodiment, the display surface 706 is similar to the display surfaces 106 and 606.

In an embodiment, the portions of viewpoints 712A-12C are each portions of images captured from a different viewpoint for individual display for the plurality of individuals 704A-04C. For example, one or more of the portions of viewpoints 712A-12C may have been captured by a virtual camera similar to the virtual camera 208 at a different position and/or orientation in a virtual environment. As illustrated in FIG. 7, the first viewpoint 712A depicts a tree, the second viewpoint 712B depicts a cityscape, and the third viewpoint 712C depicts a mountain scene. The portions of the viewpoints 712A-12C may be separated in the projection image 724 by splits 726 that mark the left and right sides of the portions of viewpoints 712A-12C. In an embodiment, the projection image 724 is similar to the projection images 424, 524, and 624 of FIGS. 4-6 respectively.

Depending on the locations of the splits 726, the portions of viewpoints 712A-12C may "wrap" around the projection image 724, such as in the manner that the first viewpoint is divided and located on the left and right sides of the projection image 724. In this manner, if the display surface 706 has a 360-degree viewing area, the right and left sides of the projection image 724 can be "stitched" together such that the first viewpoint 712A appears seamlessly whole.

In an embodiment, the plurality of individuals 704A-04C are similar to the one or more individuals 104 of FIG. 1. As illustrated in FIG. 7, as a result of providing the projection image 724 to a projection system, the first individual 704A views the tree on the portion of the display surface 706 directly in front of the first individual 704A, the second individual 704B views the cityscape on the portion of the display surface 706 directly in front of the second individual 704B, and the third individual 704C views the mountain scene on the portion of the display surface directly in front of the third individual 704C. It is contemplated that the system of the present disclosure includes a mathematical model or mesh model of the physical space 702 such that the system determines how the projection image 724 is to be transformed in order to be displayed on the display surface with reduced distortion. In this manner, the plurality of viewpoints 712A-12C may be displayed on the display surface 706 in a manner that appears realistic to the plurality of individuals.

It is thus contemplated that any number of splits may be accomplished in the manner described in FIGS. 2-7. Note that in some implementations, the system of the present disclosure is capable of determining, such as via the sensor 114 of FIG. 1, the directions the plurality of individuals 704A-04C are facing and determine placement of the splits based on these determined directions. In other embodiments, however, the splits may be determined without consideration of the directions faced by the plurality of individuals 704A-04C. Furthermore, it is contemplated that splits may be reversed; that is, as members of the plurality of individuals 704-04C leave the physical space 702 or have their viewpoints otherwise disabled from the virtual world being displayed on the display surface 706 (e.g., their avatar in a virtual game is terminated, suspended, or removed), the number of splits may be reduced such that individuals still participating can have their viewing area increased on the display surface 706. For example, in a game having three players each having a 120-degree view, a player leaves the game, and the system of the present disclosure provides the remaining two players with 180-degree views on the display surface 706. Later, in the example, the second player leaves, and the system provides the remaining player with a 360-degree view on the display surface 706.

Figure 8:
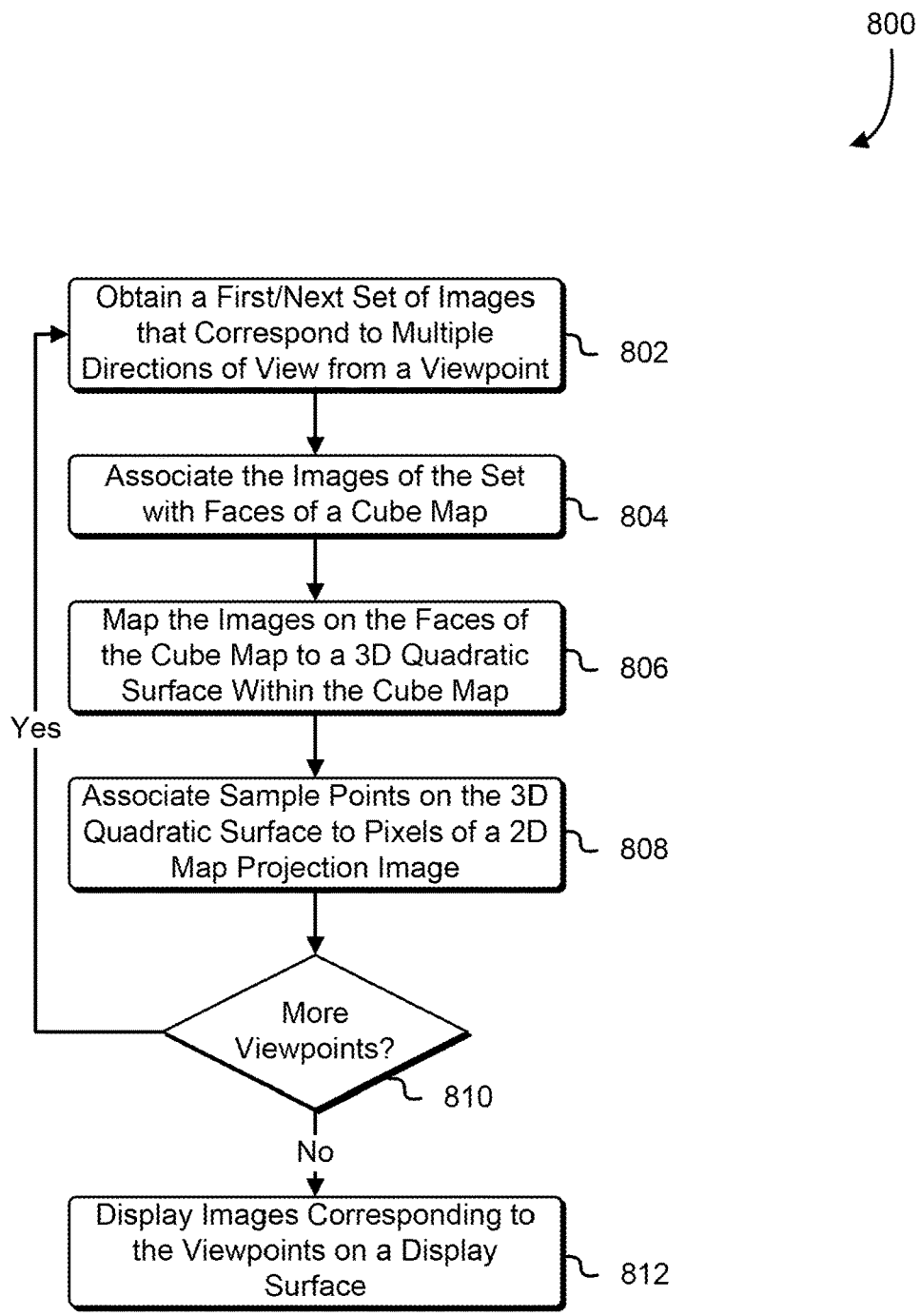
FIG. 8 is a flowchart that illustrates an example of mapping a set of images that correspond to multiple directions of view from a viewpoint to a two-dimensional map projection image in accordance with an embodiment.

FIG. 8 is a flowchart illustrating an example of a process 800 for mapping a set of images of a cube map to a two-dimensional map projection image of a three-dimensional quadratic surface within the cube map in accordance with various embodiments. The process 800 describes the steps for performing the stages illustrated in FIGS. 2-5. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 15:
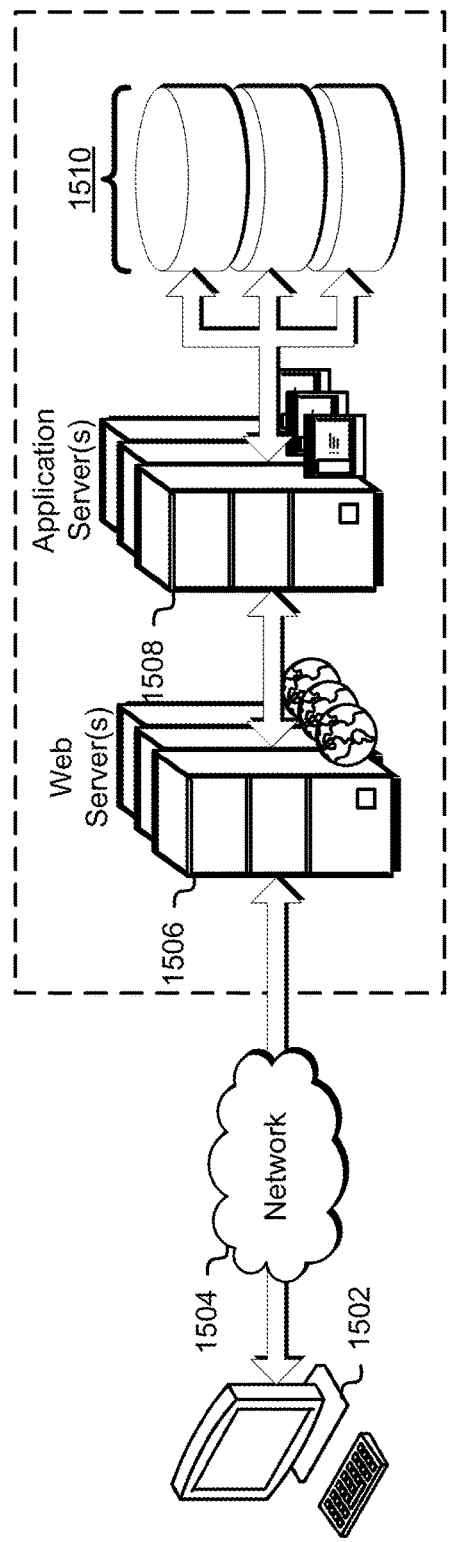
FIG. 15 illustrates an environment in which various embodiments can be implemented.

For example, some or all of process 800 may be performed by any suitable system, such as a server in a data center, by various components of the environment 1500 described in conjunction with FIG. 15, such as the one or more web servers 1506 or the one or more application servers 1508, by multiple computing devices in a distributed system of a computing resource service provider, or by any electronic client device such as the electronic client device 1502. The process 800 includes a series of operations wherein, for as many split viewpoints are to be displayed on a display surface, a first set of images corresponding to multiple directions of view from a view point are obtained and associated with a cube map, the faces of the cube map are mapped to a three-dimensional quadratic surface, the three-dimensional quadratic surface is transformed into a two-dimensional map projection image, and the two-dimensional map projection image is displayed on a display surface such that each of the sets of images contributes to a different portion of the display surface.

In 802, the system performing the process 600 may obtain a set of images that correspond to multiple directions of view from a view point. For example, the system may obtain a plurality of images from a plurality of virtual cameras in a virtual environment, each being similar to the virtual camera 208 of FIG. 2. Each of the images of the set may be taken from a different orthogonal view having an origin at the viewpoint such that the images of the set may be stitched together to form a 360-degree view from the viewpoint. In some cases, the 360-degree view may also include an up and/or down view.

In 804, the system performing the process 600 may associate the set of images together as a cube map, such as the cube maps 214, 314, 514, and 614 of FIGS. 2, 3, 5, and 6 respectively. In this manner, each of the four sides of each of the set of images may be assigned an adjacent image from the set in the arrangement they were captured from the viewpoint.

In 806, the system performing the process 600 locates a three-dimensional quadratic surface, such as a mathematical sphere, within the cube map. The type of three-dimensional quadratic surface used may be dependent upon the display surface. For example, a mathematical sphere, such as the mathematical spheres 316 and 416 of FIGS. 3 and 4 may be selected for its similarity in shape to at least a portion of display surface of a fulldome. The three-dimensional quadratic surface may additionally or alternatively be selected based on the availability, accuracy, and/or efficiency of an algorithm for transforming the three-dimensional quadratic surface into a two-dimensional map projection image.

Further in 806, the system performing the process 600 determines a series of point on the surface of the three-dimensional quadratic surface. The density (i.e., spacing) of the sample points may be based on a determined resolution for a two-dimensional map projection image of the three-dimensional quadratic surface; that is, selecting a higher density of sample points on the three-dimensional quadratic surface may yield a higher resolution two-dimensional map projection image than selecting a lower density of sample points. Still further in 806, the system may, for each sample point, determine a point of intersection on a face of the cube map of a straight (linear) line passing from a center of the three-dimensional quadratic surface through the sample point. The system may associate a pixel at the point of intersection with the sample point such that a rendering of the set of images results in a pixel at the sample point that matches the pixel at the intersection point. In some implementations, the mapping may be stored (e.g., such as in a data structure or in memory), whereas in other embodiments the pixels may be rendered onto the surface of a three-dimensional quadratic surface mesh model.

In 808, the system performing the process 600 may remap the pixels located in 806 to locations on a two-dimensional projection image by determining where the pixels at the sample points would be located on a two-dimensional projection image of the three-dimensional quadratic surface produced in accordance with a map projection algorithm. The two-dimensional map projection algorithm may be an equirectangular map projection algorithm, although other types of map projection algorithms may be utilized. Note that the mapping of the pixels from the cube map to the two-dimensional map projection image may vary based on the number viewpoints. That is, each viewpoint may correspond to a different set of images, and the viewpoints may be split up on the equirectangular map. For example, the projection images 424 and 524 of FIGS. 4 and 5 illustrate a map projection of one viewpoint on the projection images. As another example, the projection image 624 of FIG. 6 has a split 626, causing the map projection to be offset to the left for a first set of images and offset to the right for a second set of images. As yet another example, the projection image 724 of FIG. 7 has three splits, whereby a first set of images wraps around either side of the projection image and a second set of images and a third set of images are offset.

In 810, the system performing the process 600 determines whether additional viewpoints are to be displayed. For example, the system may determine that another player has entered a virtual game (e.g., by entering a physical space in which the game is being played) and determine a new viewpoint for the new player. In order to accommodate the additional player, the display surface may need to be apportioned so that each player has a portion of the display surface to view their respective view point. Thus, for each additional viewpoint, the system may return to 802 to generate a new map projection for the next set of images associated with the additional viewpoint.

In 812, the system may cause the individual viewpoints to be displayed on a display surface by dedicating portions of the projection image to the individual viewpoints and providing the resultant projection image to the hardware and/or executing software that causes the image to be appropriately displayed (e.g., compensating for distortion due to the shape of the display surface) on a display surface. For example, the projection image may be provided to a system that controls image projectors such as the image projectors 112A-12B of FIG. 1. Further details on generating the projection image is described in regards to the process 900 of FIG. 9. Note that one or more of the operations performed in 802-12 may be performed in various orders and combinations, including in parallel.

Figure 9:
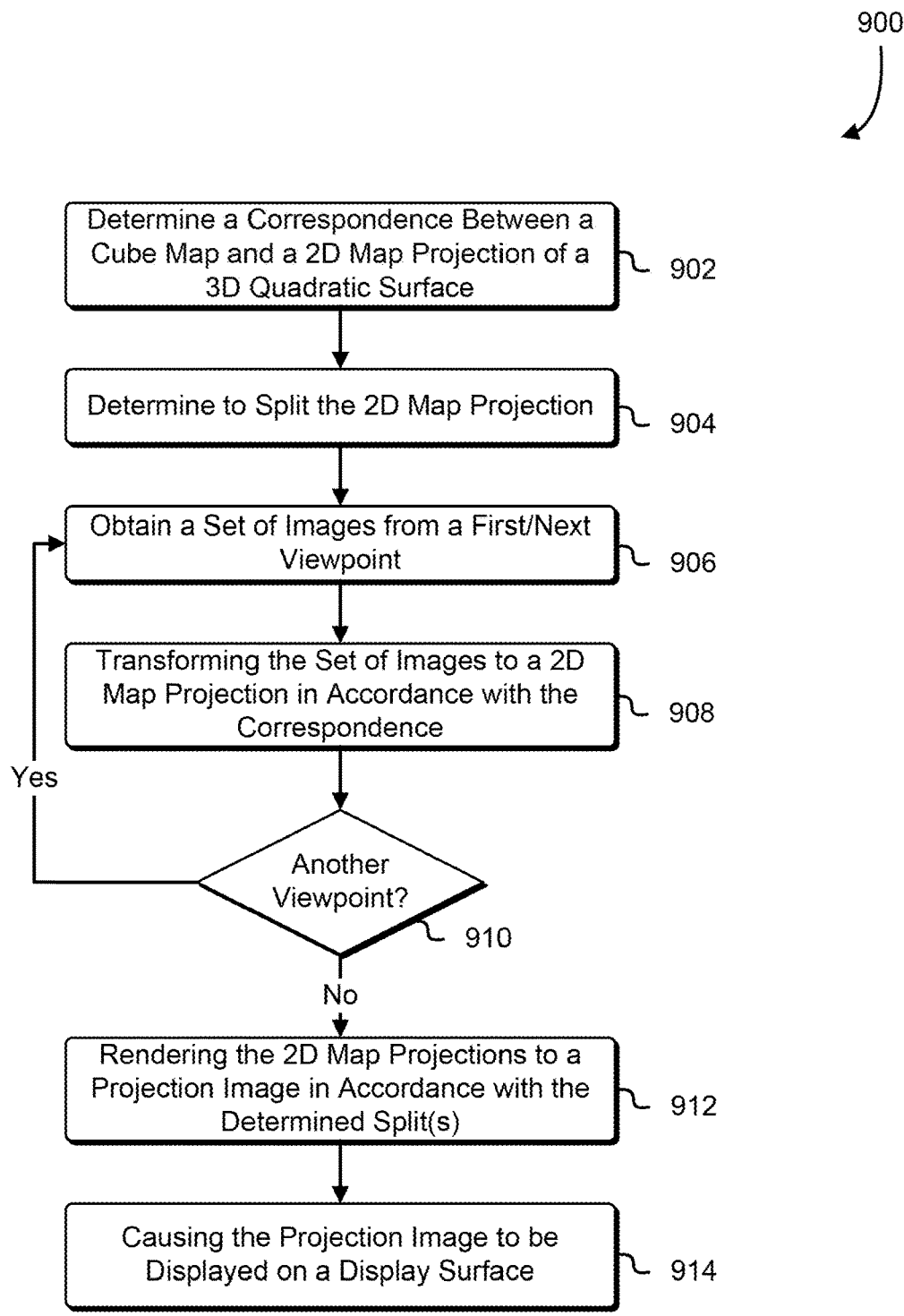
FIG. 9 is a flowchart that illustrates an example of causing a set of images mapped to a two-dimensional map projection to be displayed as a split screen in accordance with an embodiment.

FIG. 9 is a flowchart illustrating an example of a process 900 for dynamically splitting a screen in accordance with various embodiments. The process 900 describes the steps for performing the stages illustrated in FIGS. 1, and 6-7. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 900 may be performed by any suitable system, such as a server in a data center, by various components of the environment 1500 described in conjunction with FIG. 15, such as the one or more web servers 1506 or the one or more application servers 1508, by multiple computing devices in a distributed system of a computing resource service provider, or by any electronic client device such as the electronic client device 1502. The process 900 includes a series of operations wherein a correspondence between images on a cube may and a map projection is determined, the map projection is apportioned, and multiple images are rendered into their respective portions, and the map projection is displayed as a split screen on a display surface.

In 902, the system performing the process 900 may determine a correspondence between a cube map and a two-dimensional map projection of a three-dimensional quadratic surface in the manner described for the process 800 of FIG. 8. That is, a set of images representing views from a viewpoint may be mapped onto inner faces of a cube (i.e., cube map), the images may be projected onto a three-dimensional quadratic surface (e.g., a sphere) within the cube, and the three-dimensional quadratic surface may be transformed into two-dimensional map projection such that pixels associated with the cube map are mapped to the three-dimensional quadratic surface and subsequently mapped to the two-dimensional map projection. In some embodiments, this two-stage mapping is performed for each image frame. In other implementations, once the relationship between the cube map to the three-dimensional quadratic surface to the two-dimensional map projection is initially determined, a mapping between the cube map to the two-dimensional map projection may be extrapolated, thereby allowing the system to bypass mapping to and from the three-dimensional quadratic surface for every viewpoint image for further efficiency.

In 904, the system performing the process 900 may determine how many viewpoints are to be displayed on a display surface and determine how the viewpoints are to be partitioned (i.e., split). For example, the system may detect that four individuals are located within a physical space for viewing the display surface and that each of the four individuals are to be assigned and shown a different viewpoint. As another example, four individuals may be playing an interactive game located within the physical space, but the system may determine that two of the individuals have been eliminated from the game and, consequently, determine to display only the viewpoints allocated to the two remaining players. As still another example, not all individuals may be apportioned equal space on the display surface. For example, a team leader of an interactive game may be allocated 50% of the projection image to be displayed on the display surface, and other team members may be allocated portions of the projection image from the remaining 50%.

In 906, the system performing the process 900 obtains a set of images associated with a viewpoint. For example, the first set of images may be multiple views from a viewpoint captured by one or more virtual cameras similar to the virtual camera 208 of FIG. 2. In some examples, a "viewpoint" refers to a specific location (e.g., a point or points as specified by tuple(s) of coordinates in accordance with a virtual coordinate system of a virtual environment) within a virtual environment at which an image of the virtual environment (also referred to as a "view") may be captured (e.g., by a virtual camera). Multiple views from the same viewpoint may be captured by using multiple virtual cameras at the viewpoint (also referred to as a "virtual camera rig") with each of the virtual cameras having a different orientation (e.g., pointing in a different direction).

In 908, the system may assign the set of images to faces of a cube map and map pixels of the faces of the cube map to the first projection image in accordance with the correspondence (a mapping between the cube map, a three-dimensional quadratic surface within the cube map, and a two-dimensional map projection algorithm for the three-dimensional quadratic surface as described in accordance with FIGS. 2-5 and 8) determined in 902.

In 910, the system performing the process 900 may determine, based on a number of viewpoints to be displayed on the display surface as determined in 904, whether sets of images associated with additional viewpoints should be processed in accordance with the operations of 906-08. If so, then the system may return to 906 to obtain the next set of images associated with the next viewpoint. Otherwise, if each of the viewpoints has been processed, the system may proceed to 912.

In 912, the system performing the process 900 generates a projection image based on the two-dimensional map projections produced in 906-10. That is, the system determines, based on the number of viewpoints determined in 904, how each of the viewpoints should be apportioned in the projection image to be displayed on the display surface. The system then generates the projection image by rendering the portions of the two-dimensional map projections associated with their respective viewpoint to their assigned locations in the projection image, such as in manner shown in FIG. 7. In 914, the system causes the projection image to be displayed on the display surface by providing the projection image to hardware or executing software that displays images on the display surface (e.g., a projection system, a server computer that outputs to the display surface, etc.). Note that the operations of 904-14 may be repeated for each frame of a sequence of sets of images as they are received and/or captured by virtual cameras. Note that one or more of the operations performed in 902-14 may be performed in various orders and combinations, including in parallel. For example, in some implementations, the operations of 902 may be performed between 906 and 908 for each viewpoint. As another example, the operations of 906-08 may be performed in parallel for each viewpoint and the decision operation of 910 may be omitted.

Figure 10:
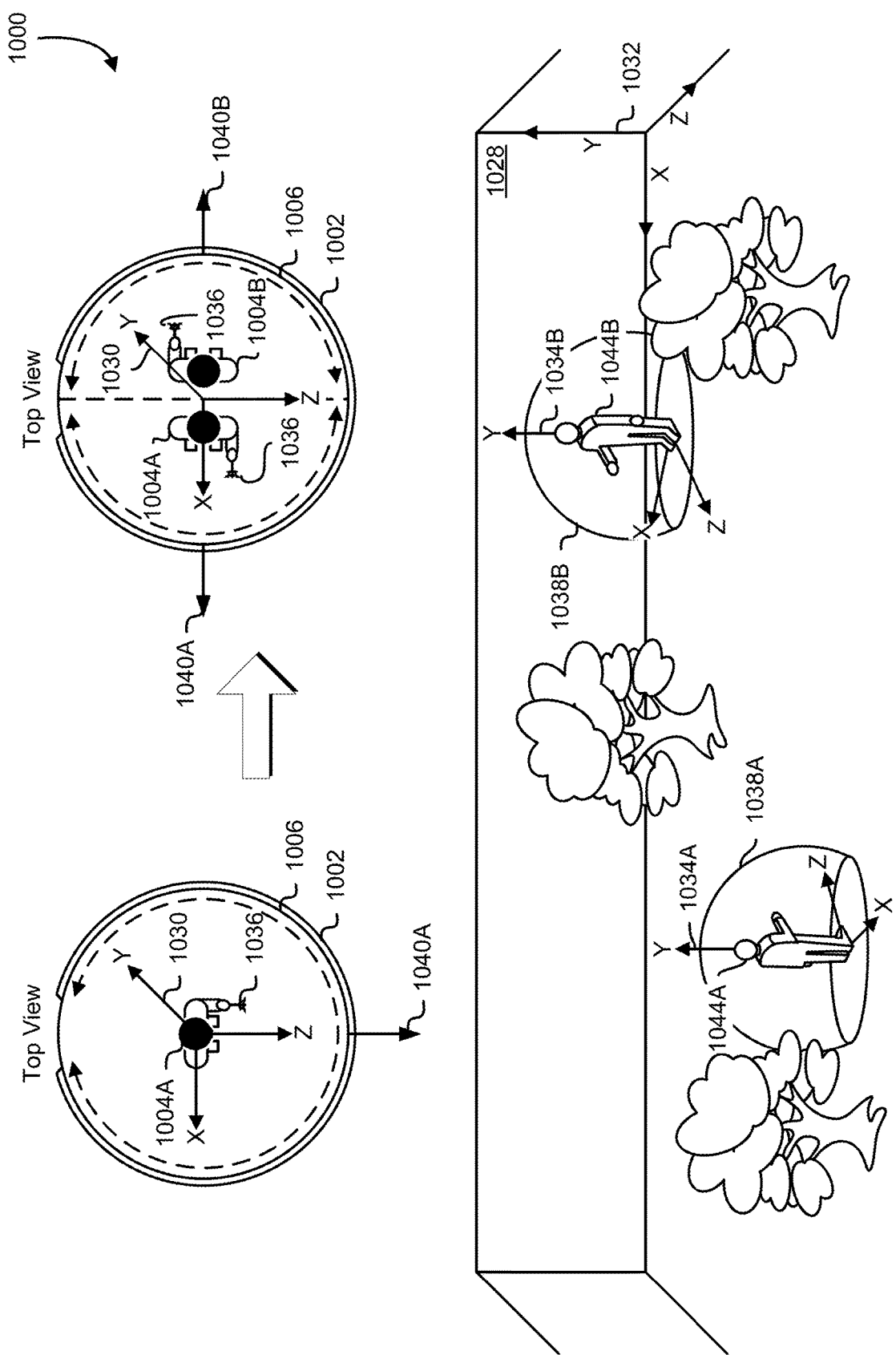
FIG. 10 illustrates an example of individuals interacting with a virtual environment in accordance with an embodiment.

FIG. 10 illustrates an example 1000 of an embodiment of the present disclosure. Specifically, FIG. 10 depicts a second individual 1004B who has joined a first individual 1004A in a physical space 1002 having a display surface 1006 upon which viewpoints from a virtual environment 1028 are displayed. The individuals 1004A-04B are depicted as possessing controllers 1036 for use in interacting with the virtual environment 1028. Various coordinate systems are employed, including a real world coordinate system 1030 associated with the physical space 1002, a virtual environment coordinate system 1032 of the virtual environment 1028, and virtual coordinate systems 1034A-34B of the virtual domes 1038A-40B associated with the individuals 1004A-04B.

In an embodiment, the physical space 1002 is similar to the physical space 102 of FIG. 1. Likewise, the individuals 1004A-04B may be similar to the one or more individuals 104A-04C. For example, the individuals 1004A-04B may be playing a competitive or cooperative game that takes place in the virtual environment. Additionally or alternatively, it is contemplated that the views displayed on the display surface 106 may be non-interactive; for example, the individuals 1004A-04B may be watching a 360-degree video viewable from different viewpoints. Additionally or alternatively, one or more images displayed on the display surface 1006 may be one or more images of the real world captured by a real, physical camera (e.g., in a real, physical camera rig). In an embodiment, the display surface 1006 is similar to the display surface 106 of FIG. 1. For example, the display surface 1006 may be a 360-degree display surface, such as a dome projection surface or a circular display screen.

In an embodiment, the virtual environment 1028 is three-dimensional computer-based simulated environment, which may be populated by graphical representations (avatars) of the individuals 1004A-04B. The virtual environment 1028 may be governed by a set of rules regarding simulated gravity, topography, locomotion, real-time actions, and communication. In various implementations, the virtual environment 1028 may or may not be associated with a game.

In an embodiment, the real world coordinate system 1030 is a system of coordinates that indicate a position of a point relative to an origin point of the physical space 1002. The origin point of the real world coordinate system may be a point in the center of the physical space 1002, but it is contemplated that the origin point may be some other point of the physical space 1002 (e.g., the center front of the physical space). Locations of objects (e.g., the individual 1004-A-04B, the controllers 1036, etc.) in or around the physical space 1002 may be detected and/or expressed as coordinates relative to the origin point of the real world coordinate system 1030. The coordinate values may be units of distance, angles, or some other type of unit. In some embodiments, the Z-axis represents forward/back, the Y-axis represents up/down, and the X-axis represents left/right relative to the origin point of the real world coordinate system 1030. For example, system of the preset disclosure may determine that the controller held by the second individual 1004B, detected as being 2.5 feet left, three feet up, and 6 inches back from the origin point, is located at coordinates (−2.5, 3, −0.5). Note that, although the coordinate systems described in the present disclosure may be described in terms of a Cartesian coordinate system in three-dimensional space, it is contemplated that the real world coordinate system 1030, the virtual environment coordinate system 1032, and the virtual coordinate systems 1034A-34B may each be one of a variety of types of coordinate systems, such as Cartesian coordinate system, a polar coordinate system, or a cylindrical or a spherical coordinate system.

In an embodiment, the virtual environment 1028 has its own independent coordinate system, the virtual environment coordinate system 1032. The virtual environment coordinate system 1032 is a system of coordinates that indicate a position of a point relative to an origin point of the virtual environment coordinate system 1032 in the virtual environment 1028. The virtual environment coordinate system 1032 may be used by the system that generates the virtual environment 1028 to determine the positions and/or orientations of virtual objects within the virtual environment 1028. Coordinates in the virtual environment coordinate system 1032 may or may not have a direct correspondence to coordinates in the real world coordinate system.

In an embodiment, the virtual domes 1038A-38B are each an area or volume that surrounds an avatar of a respective individual of the individuals 1004A-04B in a proportional manner to the physical space 1002 that surrounds the individuals 1004A-04B. Thus, virtual objects within the virtual domes 1038A-38B may not be rendered in their respective views on the display surface 1006. In the embodiment, the virtual domes 1038A-38B are associated with a specific one of the individuals 1004A-04B (although it is contemplated that multiple individuals may share a single virtual dome); for example, the first virtual dome 1038A may associated with the first individual 1004A and the second virtual dome 1034B may be associated with the second individual 1004B. Because each of the virtual domes 1034A-34B may be associated with a different one of the individuals 1004A-04B, the virtual domes 1034A-34B may be independently located and/oriented from each other, despite each being a virtual representation of the physical space 1002. Note that it is contemplated that more than one avatar may share the same virtual dome. Note too that although the virtual domes 1038A-38B are depicted as dome-shaped, it is contemplated that other three-dimensional volumes may be used, such as virtual cylinders, virtual cubes, virtual cones, etc. The type of three-dimensional volume used may be dependent upon the shape of the physical space 1002.

Each of the virtual domes 1038A-38B may have (e.g., at their center at approximately where eyes of the respective avatar would be) a virtual camera rig (not pictured), similar to the virtual camera rig 242 of FIG. 2. In order to associate the proper individual with the correct virtual dome/avatar, in some embodiments the virtual camera rig is bound/registered to or otherwise caused to be associated with a particular one of the controllers 1036. In some embodiments, multiple controllers may be bound to a single virtual camera rig, such as in an implementation where two individuals, each having controllers, still share a view from the same viewpoint of a virtual dome.

In an embodiment, the virtual coordinate systems 1034A-34B are virtual coordinate systems specific to their respective virtual domes 1038A-38B. In some embodiments, the Z-axis (or whatever axis represents the forward-facing direction of the respective virtual dome) of an individual virtual coordinate system corresponds to the direction of a respective reference vector of the reference vectors 1040A-40B. The virtual coordinate systems 1034A-34B may be independent from the virtual environment coordinate system 1032 and may be a virtual representation of the real world coordinate system 1030 as mapped to the virtual environment based on the locations of the avatars of the individuals 1004A-04B in the virtual environment 1028 and on how the display surface 1006 is split.

For example, as can be seen in the example 1000, when the first individual 1004 is the only individual in the physical space 1002 interacting with the virtual environment 1020 the center of the 360-degree view (e.g., forward-facing direction) may be aligned to the Z-axis of the real world coordinate system 1030, which also corresponds to the Z-axis of the first individual virtual coordinate system 1034A associated with the first individual 1004A. However, upon the second individual 1004B becoming an interactive participant in the virtual environment 1028, the display surface 1006 may be split in accordance with the disclosure of FIGS. 1-9. As a result of the split of the display surface 1006, each of the individuals 1004A-04B may have a 180-degree view, the center of which may be determined to be the forward-facing direction. Consequently, the forward-facing direction of the first individual 1004A, is seen in FIG. 10 to be aligned with the X-positive direction of the real world coordinate system 1030 and the forward facing direction of the second individual 1004B is seen to be in the X-negative direction of the real world coordinate system 1030. However, even though the individuals 1004A-04B may be facing away from each other in the physical space 1002, their avatars may not necessarily be facing in opposite directions in the virtual environment 1028 and may in fact be facing each other.

Note that, although the origins of the virtual coordinate systems 1034A-34B are depicted in FIG. 10 as being at the bottom center of the virtual domes 1038A-38B, it is contemplated that the origins of the virtual coordinate systems 1034A-34B may alternatively be at the top center of the virtual domes 1038A-38B, bottom front center of the virtual domes 1038A-38B, or at some other position in relation to their respective virtual domes 1038A-38B.

In an embodiment, the controllers 1036 (also referred to as controller devices) are devices used to provide input to the system that operates/simulates the virtual environment 1028 (e.g., a game engine). The controllers 1036 may include one or more sensors to detect and/or track information about events or changes in the environment and send the information to another electronic component (e.g., a processor). Such one or more sensors may include an accelerometer, gyroscope, compass, image sensor, photosensor, microphone, clock, global positioning system (GPS) receiver, magnetometer, tactile sensor, or temperature sensor. It is contemplated, however, that in some embodiments the system may be non-interactive. For example, the individuals 1004A-04B within the physical space 1002 may view real scenes live-captured or pre-recorded by one or more physical cameras and, as a result, the individuals 1004A-04B may not have the ability to interact with the system using the controllers 1036. Additionally or alternatively, in some implementations, the individuals 1004A-04B may interact with the system without controllers; for example, the system may be equipped with motion tracking devices, depth tracking devices, or object tracking devices that are usable to determine locations of portions of the bodies of the individuals 1004A-04B within the virtual space and/or to recognize input commands made via voice or gestures.

The controllers 1036 may be used to interact with the virtual environment 1028, such as to control an object or character in a virtual world. In some implementations, the controllers 1036 may communicate with the system that operates/simulates the virtual environment 1028 via one or more wires, while in other embodiments the controllers 1036 may utilize wireless communication to communicate with the system. In some embodiments, the controllers 1036 may be held by the individuals 1004A-04B, while in other embodiments the controllers 1036 are devices that may be worn (e.g., gloves, helmet, etc.) by the individuals 1004A-04B. The controllers 1036 may provide position and orientation information to the system of the present disclosure, and from this information, the system may derive the location and/or orientation of the individuals 1004A-04B. In some implementations, the controllers 1036 may provide haptic feedback to the individuals 1004A-04B in the form of force, vibration, or motion.

For example, the system may determine, based on one or more sensors in one of the controllers 1036 belonging to the first individual 1004A, a location on the display surface 1006 at which the controller is pointing and cause a digital object (e.g., a reticle, an icon, a pointer, a cursor, etc.) to be rendered on the display surface at that location. If the first individual 1004A presses a trigger button on the controller, an avatar of the first individual 1004A in the virtual environment 1028 may be caused to discharge a weapon in a direction relative to the forward direction of the first virtual dome 1038A analogous to a direction toward which the controller of the first individual 1004A is pointing relative to a first reference vector 1040. Additionally or alternatively, if the first individual 1004A tilts the controller downward, it may cause the first virtual dome 1038A to orient itself in the direction represented by the direction pointed to by the controller such that the view displayed on the portion of the display surface 1006 allocated to the first individual 1004A appears to turn; e.g., the first individual virtual coordinate system 1034A may be reoriented such that the positive Z-axis of the virtual dome 1038A corresponds to the first reference vector 1040A.

In an embodiment, the reference vectors 1040A-40B are vectors representing the forward facing direction of an individual viewpoint displayed on the display surface 1006. For example, when the display surface 1006 is only displaying one viewpoint (e.g., 360-degree view, unsplit), the first reference vector 1040A may be aligned with the front axis (e.g., positive Z-axis) of the real world coordinate system 1030. If the first individual 1004A wishes to, for example, aim a virtual reticle 30 degrees to the left of front (Z-axis of the first individual virtual coordinate system 1034A) of the first virtual dome 1038A, the first individual 1004 may need merely to aim the controller at the display surface 1006 30 degrees to the left of the Z-axis of the real world coordinate system 1030.

However, when the display surface 1006 is displaying multiple viewpoints simultaneously, the orientation of the real world coordinate system 1030 and the individual virtual coordinate systems 1034 may no longer be in alignment. The change in alignment may be represented by the reference vectors 1040A-40B. For example, when the display surface 1006 is displaying multiple viewpoints, the reference vectors 1040A-40B may be changed to designate the forward facing direction of the respective views. For example, when the second individual 1004B begins interacting with the system of the present disclosure and a portion of the display surface 1006 is split into two viewpoints of equal size, the first reference vector 1040A of the first individual 1004A may be changed to be aligned with the right axis (e.g., positive X-axis) while the second individual 1004B may be assigned a second reference vector 1040B that is aligned with the left axis (e.g., negative X-axis). Thus, the reference vectors 1040A-40B may be vectors in the real world coordinate system 1030 that correspond to the front-facing (e.g., positive Z) axes of the virtual domes 1038A-38B.

In an embodiment, the avatars 1044A-44B are virtual representations of the individuals 1004A-04B in the virtual environment 1028. In some implementations, the avatars 1044A-44B may have three-dimensional forms and may rendered as a graphical object on the display surface 1006, whereas in other implementations the avatars 1044A-44B may only be points or vectors that indicate the position and/or orientations of the avatars 1044A-44B within the virtual environment 1028. In some implementations, an avatar of an individual may not be viewable (or may only be partially viewable) in the particular view on the display surface 1006 associated with the individual, but may be viewable by other individuals via their respective views. In various implementations, the avatars 1044A-44B may have the ability to move (i.e., change position and/or orientation) in one or more coordinate directions.

Figure 11:
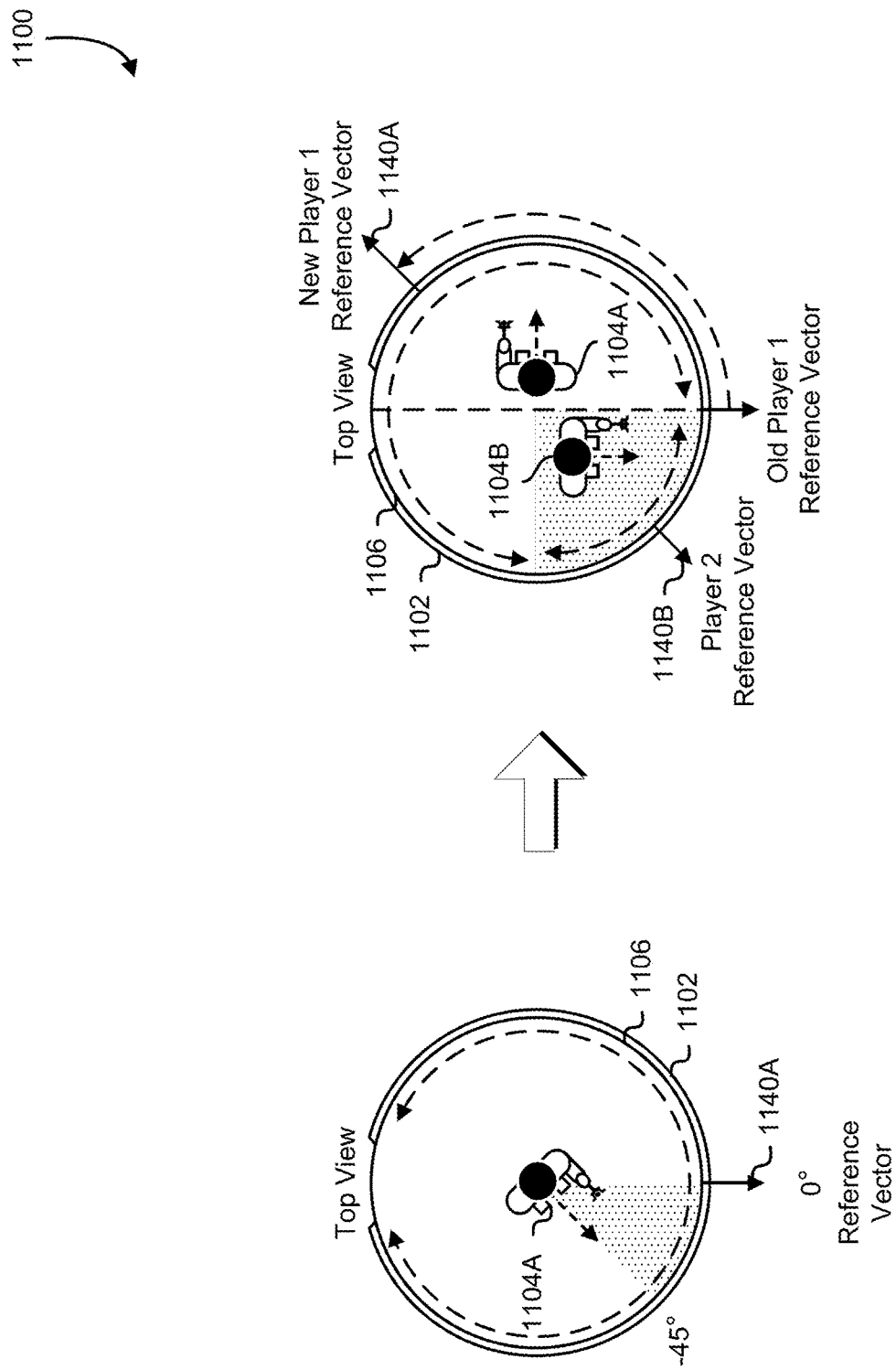
FIG. 11 illustrates an example of dynamically updating a reference vector in accordance with a screen split in accordance with an embodiment.

FIG. 11 illustrates an example 1100 of an embodiment of the present disclosure. Specifically, FIG. 11 depicts how reference vectors 1140A-40B may be assigned and changed depending on how the views depicted by a display surface 1106 are split. In an embodiment, the physical space 1102 is similar to the physical spaces 102 and 1002 of FIGS. 1 and 10. Likewise, in an embodiment, the display surface 1106 is similar to the display surfaces 106 and 1006 of FIGS. 1 and 10. As noted in the present disclosure, although the display surface 1106 is depicted as curved and concave, it is contemplated that the techniques described herein may be applied to convex, flat, or multiple flat display surfaces. An example of the latter may be a display surface that comprises two or more flat screens facing in different directions (e.g., at right angles to each other, at 30-degree angles from each other, or facing each other, etc.). In various embodiment, the display surface 1106 is a surface viewable in 360 degrees (e.g., has a surface with a 360-degree viewing area). However, the benefit of using the reference vectors 1140A-40B to facilitate reorienting the forward view(s) displayed on the display surface 1106 while split or unsplit may be improved if the display surface 1106 is other than a single-planed surface.

In an embodiment, the individuals 1104A-04B are similar to the individuals 104A-04C and 1004A-04B of FIGS. 1 and 10 respectively. At a time that only the first individual 1104A is interacting with the system of the present disclosure, the display surface 1106 may present a 360-degree view from a single viewpoint. In an embodiment, the reference vectors 1140A-40B, similar to the reference vectors 1040A-40B, are vectors that indicate the forward-facing directions of the portions of the display surface 1106 assigned to particular viewpoints. As a result, the first reference vector 1140A may represent the front-facing view of the single viewpoint. In embodiments, the first reference vector 1140A is associated with the view of the display surface 1106, rather than the position and orientation of the first individual 1104A and/or controller such that even if the first individual 1140A moves (e.g., turns 45 degrees clockwise), the first reference vector 1140A does not change.

At a time that more than one individual has a dedicated portion of the display surface 1106, such as while the physical space 1102 is occupied by both of the individuals 1104A-40B, however, the first reference vector 1140A may change. In the example 1100 illustrated in FIG. 11, the second individual 1140B may have only been allocated 25% of the display surface 106 (e.g., the avatar of the second individual 1140B may be travelling in a vehicle with only a forward view). Consequently, the second reference vector 1140B may be designated to indicate the forward-facing direction (e.g., outer-pointing center normal) of the display surface 1106 for the view associated with the second individual 1104B. On the other hand, the first reference vector 1140A associated with the first individual 1104A may be changed (e.g., rotated 135 degrees) in order to indicate the new forward-facing direction the display surface 1106 for the view associated with the first individual 1104A.

Note that the reference vectors 1140A-40B may be dynamically updated as the splits of the display surface 106 change. For example, if the view of the second individual 1104B widens (e.g., increases from 90 degrees to 120 degrees) or narrows on the display surface 1106 (decreases from 90 degrees to 30 degrees) and/or the first individual 1104A widens or narrows on the display surface 1106, their respective reference vectors 1140A-40B may be reoriented and/or removed as needed. Similarly, if one of the individuals 1104A-04B withdraws from participating, or if another individual (e.g., the third individual 104C of FIG. 1) joins, reference vectors may be reoriented and/or added.

A benefit provided by the reference vectors 1140A-40B is that the input (e.g., via the controllers 1036A-36B) to the system that operates/simulates the virtual environment and/or provides the images depicted on the display surface 1106 need only be provided in relation to the reference vectors 1140A-40B. In this manner, rather than providing the system that operate/simulates the virtual environment with information about the number of splits of the display surface, how the splits are apportioned, and their location relevant to the real world coordinate system 1030, the system of the present disclosure can simply provide the position and/or orientation information in relation to the reference vectors 1140A-40B. This effect is further illustrated in FIG. 12.

Figure 12:
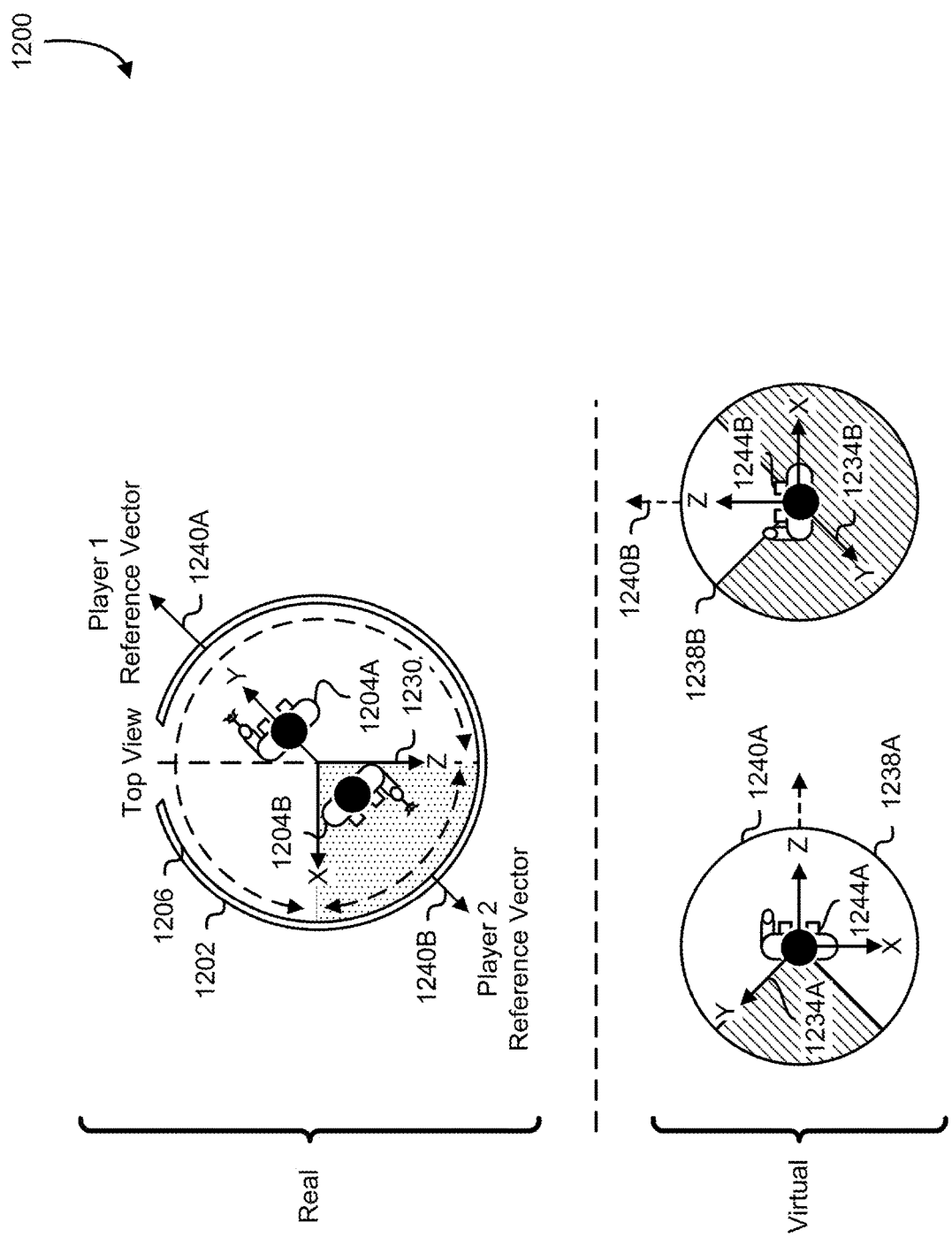
FIG. 12 illustrates an example of the correspondence between reference vectors and individual virtual coordinate systems in accordance with an embodiment.

FIG. 12 illustrates an example 1200 of an embodiment of the present disclosure.

Specifically, FIG. 12 depicts the relationship between reference vectors 1240A-40B and the front-facing direction in a virtual environment (e.g., virtual domes 1238A-38B). In an embodiment, the physical space 1202 is similar to the physical spaces 102, 1002, and 1102 of FIGS. 1, 10, and 11 respectively. Likewise, in an embodiment, the display surface 1206 is similar to the display surfaces 106, 1006, and 1106. In an embodiment, the individuals 1204A-04B are similar to the individuals 1104A-04B of FIG. 11. The individuals 1204A-04B may be jointly viewing scenes displayed on the display surface 1206. In an embodiment, the avatars 1244A-44B are similar to the avatars 1044A-1044B described in conjunction with FIG. 10. Likewise, in an embodiment, the virtual domes 1238A-38B are similar to the virtual domes 1038A-38B.

In an embodiment, the reference vectors 1240A-40B are similar to the reference vectors 1040A-40B and 1140A-40B of FIGS. 10 and 11 respectively. That is, the reference vectors 1240A-40B may be vectors in real space that correspond to the front-facing axis of the individual virtual coordinate systems 1234A-34B. As a result, even though the orientation of the virtual domes 1238A-38B and their respective individual virtual coordinate systems 1234A-34B may no longer correspond to the orientation of a real world coordinate system 1230 associated with the physical space 1002, the front-facing axes (Z-axes) of the individual virtual coordinate systems 1234A-34B may still correspond to their respective reference vectors 1240A-40B. In this manner, input received (e.g., via controllers controlled by the individuals 1204A-04B) relative to the reference vectors 1240A-40B may be straightforwardly translated in a virtual environment relative to the respective front-facing axes of the individual virtual coordinate systems 1234A-34B. In an embodiment, the individual virtual coordinate systems 1234A-34B are coordinate systems associated with the virtual domes 1238A-38B and/or the avatars 1244A-44B and may be independent from a virtual coordinate system (e.g., the virtual environment coordinate system 1032) of a virtual environment inhabited by the avatars 1244A-44B such that, as an orientation of an individual virtual dome and/or avatar changes, the respective individual virtual coordinate system may change in a like manner.

The example 1200 illustrates how the first individual 1204A, having been assigned 75% of the display surface 1206 for viewing, effectively has a 75% viewing area from the viewpoint of the first virtual dome 1238A. The example 1200 also shows how the first reference vector 1240A of the first individual 1204A, being centered in the view of the display surface 1206 that has been allocated to the first individual 1204A corresponds to the front-facing axis (positive Z-axis) of the first individual virtual coordinate system 1234A; that is, as shown in FIG. 12, the reference vector 1240A perpendicularly intersects the center of the portion of the display surface 1206 allocated to the first individual 1204A. Similarly, the example 1200 illustrates how the second individual 1204B, having been assigned 25% of the display surface 1206 for viewing, effectively has a 25% viewing area from the viewpoint of the second virtual dome 1238B. The example 1200 also shows how the second reference vector 1240B of the second individual 1204B, being centered in the view of the display surface 1206 that has been allocated to the second individual 1204B corresponds to the front-facing axis (positive Z-axis) of the second individual virtual coordinate system 1234B; that is, as shown in FIG. 12, the reference vector 1240B perpendicularly intersects the center of the portion of the display surface 1206 allocated to the second individual 1204B.

As illustrated in the example 1200, the correspondence between the reference vectors 1240A-40B may not change even though the orientation of the respective virtual domes 1238A-38B and individual virtual coordinate systems 1234A-34B may change. That is, the virtual domes 1238A-38B and individual virtual coordinate systems 1234A-34B may rotate or otherwise change orientation (e.g., even turn upside-down), but the reference vectors 1240A-40B may always correspond to the front-facing axes of their associated virtual dome or individual virtual coordinate system.

Figure 13:
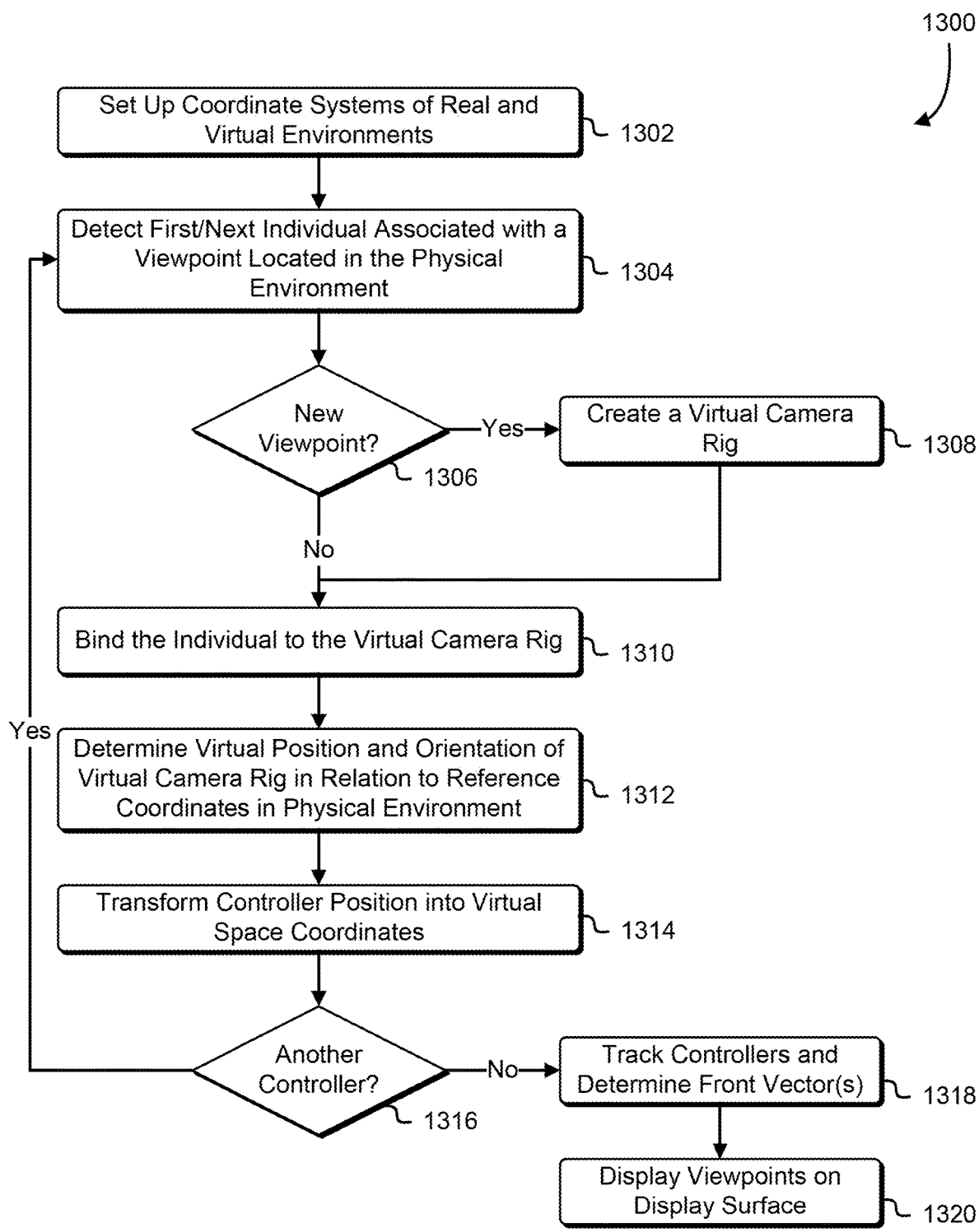
FIG. 13 is a flowchart that illustrates an example of controller binding in accordance with an embodiment.

FIG. 13 is a flowchart illustrating an example of a process 1300 for binding controllers to a viewpoint of a virtual environment using reference vectors in accordance with various embodiments. Some or all of the process 1300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1300 may be performed by any suitable system, such as a server in a data center, by various components of the environment 1500 described in conjunction with FIG. 15, such as the one or more web servers 1506 or the one or more application servers 1508, by multiple computing devices in a distributed system of a computing resource service provider, or by any electronic client device such as the electronic client device 1502. The process 1300 includes a series of operations wherein the real world coordinate system is established and, for each controller detected in a physical space, the controller is bound to a virtual camera rig in a virtual environment, and the relationship between the position and orientation of the virtual camera rig and the real world coordinate system is determined.

In 1302, the system performing the process 1300 may determine a (real) world coordinate system that may be used to determine the position and orientation of points (e.g., locations of controllers and/or individuals) within a physical space, such as the physical space 1002 of FIG. 2. For example, the center of the floor of the physical space may be determined to represent the origin point of the real world coordinate system. In this manner, positions and orientations of controllers and/or individuals within the physical space may be designated values that indicate the positions and orientations of controllers and/or individuals in relation to the origin point of the real world coordinate system. For example, if a controller is one meter forward, six centimeters to the right, and half a meter up from the bottom center of the physical space, the real position of the controller in real coordinates may be given as (0.06, 0.5, 1). Rotations of controllers or other objects tracked within the physical space may be expressed with any of a variety of formats, such as by direction cosines, Euler angles, angle axis representation, spherical/polar coordinates, or quaternions.

Further in 1302, the system may determine the virtual coordinate system within the mathematical volume that represents a virtual environment. For example, the system may determine the virtual environment coordinate system 1032 of the virtual environment 1028 of FIG. 10. Also in 1302, the system may determine a real world coordinate system of a physical space in which individuals will be viewing a display surface depicting views of the virtual environment. For example, the system may set up the real world coordinate system 1030 of the physical space 1002.

In 1304, the system performing the process 1300 detects a position and/or orientation of an individual within a real coordinate space (e.g., the physical space 1002 of FIG. 10). In some embodiments, the system detects the individual by detecting an activated controller (e.g., a controller, such as one of the controllers 1036, attempting to communicate with and interact with the system) within the physical space; in such embodiments, the system may assume that the controller is held, worn, or otherwise in the possession of or under the control of an individual.

In 1306, the system performing the process 1300 determines whether the detected individual will be associated with a new or existing viewpoint in the virtual environment. For example, for the first individual detected, the system may determine to give the individual a viewpoint in the virtual world and proceed to 1308 to create a virtual camera rig for the viewpoint. For a subsequent individual detected, the system may likewise determine to create another viewpoint in the virtual world and proceed to 1308 to create another virtual camera rig for the viewpoint. Alternatively, in some implementations, a subsequent individual may share a viewpoint (and a virtual camera rig) with another individual (e.g., such as in a cooperative game), in which case the system may proceed to 1310 to bind the controller to the virtual camera rig.

In 1308, if the system performing the process 1300 determines to create a new virtual camera rig, the system performing the process 1300 sets up a virtual camera rig, such as the virtual camera rig 242 of FIG. 2, at a viewpoint in the virtual environment. The virtual camera rig may be set up to be associated with an individual virtual coordinate system of a virtual dome, such as one of the virtual coordinate systems 1034A-34B of FIG. 10. The virtual camera rig may further be centered at the viewpoint, which may be the origin point of the individual coordinate system but offset some distance upward so as to be a viewpoint as seen from the "eyes" of an avatar in the center of the virtual dome. At least one of the virtual cameras of the virtual camera rig may be pointed/aimed/oriented an axis of the individual coordinate system.

In 1310, the system performing the process 1300, as a result of determining a virtual camera rig (e.g., a new virtual camera rig or an existing camera rig) to assign the individual to in 1306-1308, may bind the controller detected in 1304 to the assigned virtual camera rig. In embodiments, binding (also referred to as "registering") a controller to a virtual camera rig involves storing (e.g., in memory or persistent storage) a set of data that includes information identifying the controller (e.g., by an identifier or other self-identifying data transmitted to the system) and information (e.g., an identifier of a virtual object) identifying the virtual camera rig to which the controller is assigned within the virtual environment. Also in 1310, binding the controller may include establishing a communications channel between the system and the controller for exchanging data, such as position and orientation data, data indicating that one or more controls (e.g., buttons, triggers, etc.) have been pressed/depressed or otherwise activated, sensor data, and/or haptic feedback data.

In 1312, the system performing the process 1300 may determine the relationship between the virtual rig position and orientation in the virtual environment and the real world coordinate system of the physical space in which controllers and/or individuals are being tracked. For example, the system may map (e.g., in coordinates of the virtual coordinate system of the virtual environment) an origin point and orientation of the individual virtual coordinate system associated with the virtual camera rig created in 1308 to a reference point (e.g., the origin point of the real world coordinate system).

As a result of the mapping operations performed in 1312, in 1314, the system performing the process 1300 may translate position and orientation of the bound controller and/or individual in the physical space to a corresponding position and orientation within a virtual dome associated with the individual virtual coordinate system, such as one of the virtual domes 1038A-38B of FIG. 10. For example, in some embodiments, the system includes an application programming interface that, when called, causes the system to translate the position and orientation data of the tracked controller in the real space to the corresponding position and orientation within the virtual dome. In some implementations, the application programming interface additionally or alternatively translates the position and orientation data of the tracked controller in the real space to a corresponding position and orientation into the actual virtual environment coordinates, whereas in other implementations the system that operates/simulates the virtual environment (which may be the same or different system than the system performing the process 1300) receives the position and orientation within the virtual dome that corresponds to the position and orientation of the bound controller in the physical space, and then transforms the position and orientation within the virtual dome into the corresponding position and orientation into the actual virtual environment coordinates. Alternatively, the system may map a position and orientation of the virtual camera rig in the virtual environment to an initial position and orientation of the controller bound in 1310 relative to the origin point of real world coordinate system of the physical space.

The operations of 1304-14 may be repeated for each controller in the physical space to be tracked. Thus, in 1316, the system performing the process 1300 determines whether further controllers need to be bound to virtual camera rigs. If so, the system may return to 1304 to bind the next controller. Otherwise, if no further controllers remain to be bound, the system may proceed to 1318. In 1318, the system may assign and modify the reference vectors described in conjunction with FIGS. 10-12 in the manner described in the present disclosure, such as according to the process 1400 of FIG. 14. Additionally in 1318, the system may continue to track position and/or orientation and/or other data (e.g., sensor data, button activation, etc.) received from the controllers bound to the virtual camera rigs. Lastly, in 1320, the system performing the process 1300 may cause the display surface viewed by the individuals to display images from one or more viewpoints in accordance with embodiments described herein (e.g., FIGS. 1-9). Note that one or more of the operations performed in 1302-20 may be performed in various orders and combinations, including in parallel.

Figure 14:
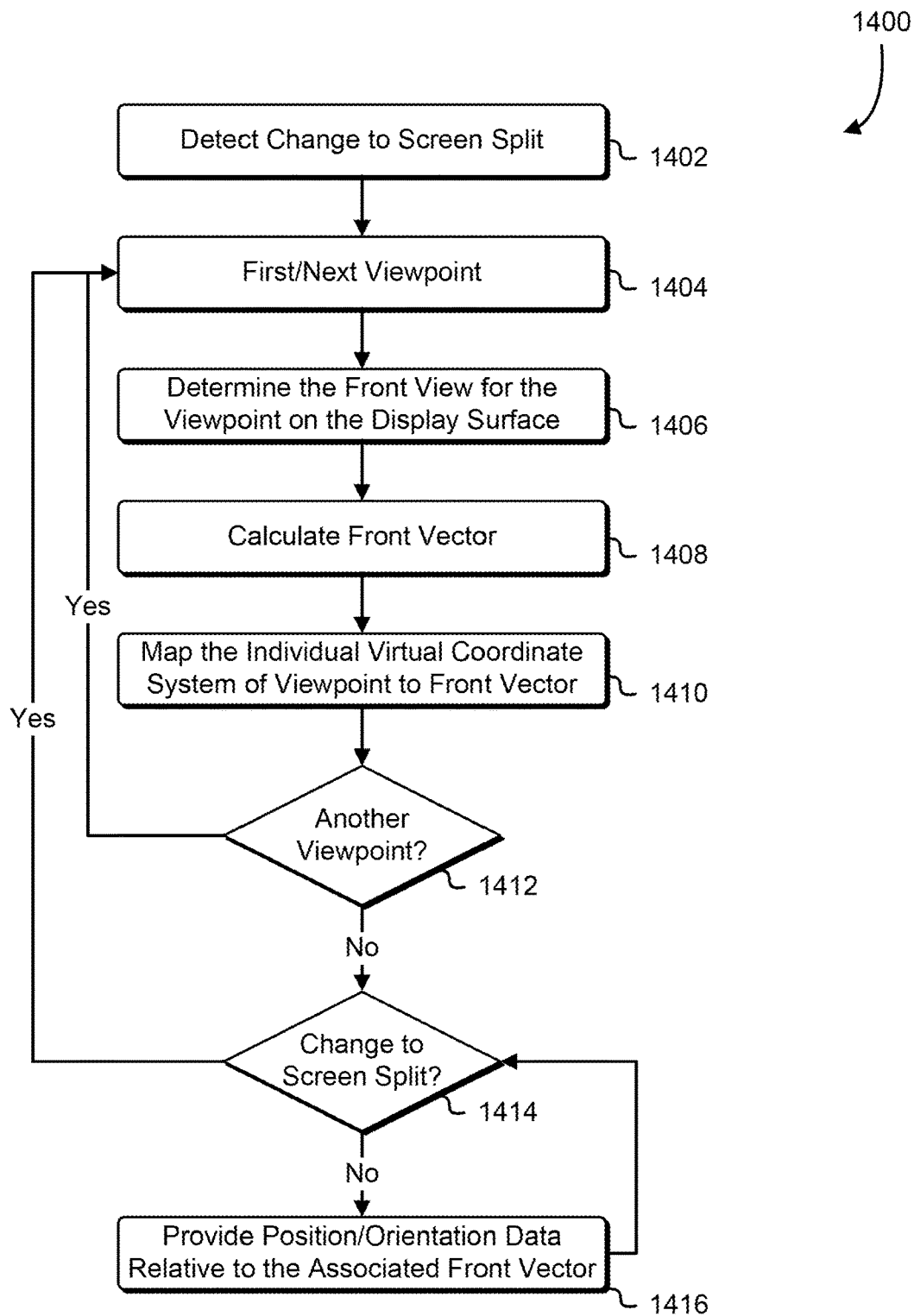
FIG. 14 is a flowchart that illustrates an example of computing reference vectors in accordance with an embodiment.

FIG. 14 is a flowchart illustrating an example of a process 1400 for determining a reference vector in accordance with various embodiments. Some or all of the process 1400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1400 may be performed by any suitable system, such as a server in a data center, by various components of the environment 1500 described in conjunction with FIG. 15, such as the one or more web servers 1506 or the one or more application servers 1508, by multiple computing devices in a distributed system of a computing resource service provider, or by any electronic client device such as the electronic client device 1502. The process 1400 includes a series of operations wherein the system determines that a screen split has occurred or been changed and, for each viewpoint in a virtual environment, calculates a reference vector in a real world coordinate system and maps the reference vector to the front-facing direction of an individual virtual coordinate system in the virtual environment.

To start, in 1402, the system performing the process 1400 determines that a change to a screen split of the display surface has occurred or that the system is initializing and the reference vectors for the viewpoints have not yet been calculated. For example, if an individual has been added or removed from the individuals being tracked by the system and the display surface has been repartitioned (e.g., a portion of the display surface has been allocated to a newly added individual, portions of the display surface allocated to previously added individuals have moved and/or resized, or a portion of the display surface previously allocated to an individual no longer being tracked is deallocated and/or reallocated at least in part to another individual) or reference vectors for all of the viewpoints have not been calculated yet because the system is initializing, the system may determine that one or more reference vectors are to be calculated or updated.

In 1404, the system performing the process 1400 locates a viewpoint (e.g., corresponding to a virtual dome or virtual camera rig that corresponds to a view on the display surface) for which a reference vector is to be calculated. In 1406, the system performing the process 1400 determines the portion of the display surface associated with the viewpoint, such as in the manner described concerning FIGS. 10-12, and determines the reference vector of that portion of the display surface. Using the example 1200 to illustrate, the first individual 1204A has a 270-degree portion of the display surface 1206. In an implementation, the system determines the center of the portion of the display to be the front-facing for the reference vector because it gives equal views to the left and right of the first individual 1204. However, it is contemplated that there may be other factors used in determining the front-facing direction, in which case the center of the portion of the display of an individual may not be determined to be the front for all embodiments. In the example 1200, the front is determined to be 130 degrees counterclockwise from the positive Z-axis of the real world coordinate system 1230.

In 1408, the system performing the process 1400 calculates the reference vector relative to the forward (e.g., Z-axis) of the real world coordinate system of the physical space. Continuing to use the example 1200 of FIG. 12 to illustrate, the reference vector for the first individual 1204A may be determined to be first reference vector 1240A that passes through the center (i.e., the front-facing direction determined in 1406) of the portions of the display surface 1206 allocated to the first individual 1204A.

In 1410, the system performing the process 1400 map or remaps the reference vector of the viewpoint to a front-facing axis of an individual virtual coordinate system associated with the individual or controller that corresponds to the viewpoint. In embodiments, if the individual virtual coordinate system changes position or orientation within the virtual environment (e.g., if the viewpoint moves/changes to a new position or orientation, such as if the individual's avatar moves and/or turns), the reference vector need not be remapped because the reference vector mapped is relative to the individual virtual coordinate system rather than relative to the virtual coordinate system of the virtual environment. The position and orientation of the virtual camera rig relative to the virtual coordinate system of the virtual environment may instead be managed by the system that manages the virtual environment itself.

The operations of 1402-10 may be performed for each viewpoint displayed in a separate portion on the display surface. Consequently, in 1412, the system performing the process 1400 may determine whether another viewpoint remains to be processed. If so, the system may return to 1402 to perform the operations of 1402-10 for the next viewpoint. Otherwise, the system may proceed to 1414.

In 1414, the system performing the process 1400 determines whether there has been a change to the screen split of the display surface as described in 1404. For example, if a viewpoint of an individual or tracked controller has been added or removed in accordance with one of the embodiments described in the present disclosure, the system may determine that a screen split change has occurred and return to 1404 to calculate or recalculate the reference vectors for the viewpoints. On the other hand, if there has been no change to a screen split of the display surface, then the reference vectors may already exist and be up-to-date, in which case the system may proceed to 1416. Otherwise, if the reference vector is to be calculated or updated, the system may proceed to 1406 to calculate the reference vector for the viewpoint.

In 1416, as position and/or orientation information is received (e.g., from a controller or tracking device), the system performing the process 1400 may determine which virtual camera rig is associated with the position and/or orientation information (e.g., referring to the controller binding information from 1310 of FIG. 13), and obtains the reference vector that corresponds with the received position and/or orientation information. The system may then modify the position and/orientation information to be relative to the reference vector and then provide the modified position and/or orientation information to the system that operates/simulates the virtual environment. In this manner, regardless of the number and apportionment of the screen splits on the display surface, the position and/or orientation information provided to the system that operates/simulates the virtual environment may always be provided relative to the front-facing direction of the individual virtual coordinate system associated with the viewpoint. The system may continue to check in 1414 whether a screen split of the display surface has occurred in order to keep the reference vectors up-to-date. Note that one or more of the operations performed in 1402-16 may be performed in various orders and combinations, including in parallel. For example, the operations of 1404-10 may be performed in parallel for each viewpoint, which may obviate the viewpoint determination operation of 1412.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 15 illustrates aspects of an example environment 1500 for implementing aspects in accordance with various embodiments. As will be appreciated, although a web-based environment is used for purposes of explanation, different environments may be used, as appropriate, to implement various embodiments. The environment includes an electronic client device 1502, which can include any appropriate device operable to send and/or receive requests, messages, or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1500 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 15. Thus, the depiction in FIG. 15 should be taken as being illustrative in nature and not limiting to the scope of the disclosure.

The network 1504 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1504 are well known and will not be discussed in detail. Communication over the network 1504 can be enabled by wired or wireless connections and combinations thereof. In an embodiment, the network 1504 includes the Internet and/or other publicly-addressable communications network, as the environment 1500 includes one or more web servers 1506 for receiving requests and serving content in response thereto, although for other networks an alternative device serving a similar purpose could be used as would be apparent to one of ordinary skill in the art.

The illustrative environment 1500 includes one or more application servers 1508 and data storage 1510. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1508 can include any appropriate hardware, software and firmware for integrating with the data storage 1510 as needed to execute aspects of one or more applications for the electronic client device 1502, handling some or all of the data access and business logic for an application. The one or more application servers 1508 may provide access control services in cooperation with the data storage 1510 and is able to generate content including, text, graphics, audio, video, and/or other content usable to be provided to the user, which may be served to the user by the one or more web servers 1506 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1502 may be processed by the electronic client device 1502 to provide the content in one or more forms including forms that are perceptible to the user audibly, visually, and/or through other senses. The handling of all requests and responses, as well as the delivery of content between the electronic client device 1502 and the one or more application servers 1508, can be handled by the one or more web servers 1506 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1510 can include several separate data tables, databases, data documents, dynamic data storage schemes, and/or other data storage mechanisms and media for storing data relating to a particular aspect of the present disclosure. For example, the data storage 1510 may include mechanisms for storing various types of data and user information 1516, which can be used to serve content to the electronic client device 1502. The data storage 1510 also is shown to include a mechanism for storing log data, such as application logs, system logs, access logs, and/or various other event logs, which can be used for reporting, analysis, or other purposes. It should be understood that there can be many other aspects that may need to be stored in the data storage 1510, such as page image information and access rights information, which can be stored in any of the above listed mechanisms as appropriate or in additional mechanisms in the data storage 1510. The data storage 1510 is operable, through logic associated therewith, to receive instructions from the one or more application servers 1508 and obtain, update, or otherwise process data in response thereto. The one or more application servers 1508 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1508.

In one embodiment, a user, through a device operated by the user, can submit a search request for a match to a particular search term. In this embodiment, the data storage 1510 might access the user information to verify the identity of the user and obtain information about items of that type. The information then can be returned to the user, such as in a results listing on a web page that the user is able to view via a browser on the electronic client device 1502. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1504. These devices also can include virtual devices such as virtual machines, hypervisors, and other virtual devices capable of communicating via the network 1504.

Various embodiments of the present disclosure utilize the network 1504 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1504 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1506, the one or more web servers 1506 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1500 can include a variety of data stores and other memory and storage media as discussed above. These can reside in a variety of locations, such as on a storage medium local to (and/or resident in) one or more of the computers or remote from any or all of the computers across the network 1504. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    setting up a real world coordinate system for a physical space, the physical space including a display surface;
    detecting a controller device located within a region of the physical space;
    determining to associate the controller device with a set of virtual cameras centered at a viewpoint in a virtual environment, the set of virtual cameras being associated with a relative virtual coordinate system having an origin with a vertical axis that intersects the viewpoint in the virtual environment and a front-facing axis that corresponds to a forward-facing direction of the set of virtual cameras;
    determining that the display surface is partitioned into at least two views;
    computing, based on the real world coordinate system and a center of a first view of the at least two views, a reference vector, the reference vector corresponding to the front-facing axis;
    receiving position and orientation information relative to the real world coordinate system from the controller device;
    translating, based on the reference vector, the position and orientation information to produce translated position and orientation information; and
    causing the first view to be updated based on the translated position and orientation information.

2. The computer-implemented method of claim 1, further comprising detecting another controller device located within the region;
    determining to associate the other controller device with another set of virtual cameras centered at another viewpoint in the virtual environment, the other set of virtual cameras being associated with another relative virtual coordinate system having another front-facing axis;
    computing, based on the real world coordinate system and a center of a second view of the at least two views, another reference vector, the other reference vector corresponding to the other front-facing axis; and
    causing the second view to be updated based on the other reference vector.

3. The computer-implemented method of claim 1, wherein:
    the method further comprises:
        obtaining a virtual position and orientation of the set of virtual cameras; and
        computing, based on the translated position and orientation information, a new virtual position and orientation of the set of virtual cameras; and
    causing the first view to be updated includes displaying on the display surface an image obtained by the set of virtual cameras in accordance with the new virtual position and orientation.

4. The computer-implemented method of claim 1, wherein the display surface is dome-shaped.

5. A system, comprising:
    one or more processors; and
    memory including executable instructions that, if executed by the one or more processors, cause the system to:
        determine that a partitioning of a display surface has changed;
        calculate a reference vector according to the partitioning of the display surface;
        modify, based on the reference vector, position information in a real world coordinate system to produce modified position information; and
        provide the modified position information to a second system that provides an image to be displayed on the display surface.

6. The system of claim 5, wherein the display surface is a surface with a 360-degree viewing area.

7. The system of claim 5, wherein the display surface is a projection surface upon which an image is projected by an image projector.

8. The system of claim 5, wherein the executable instructions that cause the system to determine that the partitioning has changed includes instructions that cause the system to determine that a number views from different viewpoints displayed on the display surface has increased or decreased.

9. The system of claim 5, wherein the reference vector intersects the center of the image displayed on the display surface.

10. The system of claim 5, wherein the second system simulates a virtual environment from which the image is produced using the modified position information.

11. The system of claim 5, wherein:
the reference vector is associated with a controller device within a region of a physical space that includes the display surface; and
the executable instructions further include instructions that cause the system to obtain the position information from the controller device.

12. The system of claim 11, wherein:
the position information includes a position of the controller device relative to the real world coordinate system; and
the modified position information includes a transformation of the position into a transformed position that is relative to the reference vector.

13. A non-transitory computer-readable storage medium having stored thereon executable instructions that, if executed by one or more processors of a computer system, cause the computer system to at least:
determine that a display surface is partitioned into a first portion and a second portion;
calculate, based on a location of the first portion and the second portion, a first reference vector that indicates a front-facing direction of the first portion and a second reference vector that indicates a front-facing direction of the second portion, a direction of the first reference vector being different from a direction of the second reference vector;
obtain positions of controller devices located within a region of a physical space that includes the display surface, the positions being relative to a coordinate system of the physical space;
translate, based on the first reference vector and the second reference vector, the positions to produce first position information that is relative to the first reference vector and second position information that is relative to the second reference vector; and
cause, by transmitting the first position information and the second position information:
the first portion of the display surface to be updated based on the first position information; and
the second portion of the display surface based to be updated based on the second position information.

14. The non-transitory computer-readable storage medium of claim 13, wherein the direction of the first reference vector that indicates a front-facing direction intersects with a center of the first portion of the display surface.

15. The non-transitory computer-readable storage medium of claim 13, wherein the display surface is curved.

16. The non-transitory computer-readable storage medium of claim 13, wherein the physical space is a dome.

17. The non-transitory computer-readable storage medium of claim 13, wherein the executable instructions that cause the computer system to cause the first portion of the display surface to be updated includes instructions that cause the computer system to:
transmit the first position information to another computer system; and
receive an image that includes a graphical overlay, that upon being displayed in the first portion of the display surface, corresponds to an orientation of a controller device associated with the first position information.

18. The non-transitory computer-readable storage medium of claim 13, wherein the executable instructions further cause the computer system to:
detect a change to a partition allocated to the first portion;
recalculate, based on the change to the partition, a new first reference vector to correspond to a new front-facing direction of the first portion; and
cause the first portion of the display surface to be updated based on the new first reference vector.

19. The non-transitory computer-readable storage medium of claim 18, wherein the executable instructions that cause the computer system to detect the change include instructions that cause the computer system to detect that the second portion has been deallocated and that the first portion includes a region of the display surface previously allocated to the second portion.

20. The non-transitory computer-readable storage medium of claim 18, wherein the executable instructions that cause the computer system to detect the change include instructions that cause the computer system to detect that the display surface has added a third partition that includes a region of the display surface previously allocated to the first portion.

* * * * *